United States Patent
Sheverev et al.

(10) Patent No.: US 9,863,796 B2
(45) Date of Patent: Jan. 9, 2018

(54) SENSOR FOR MONITORING RHEOLOGICALLY COMPLEX FLOWS

(71) Applicant: Lenterra, Inc., Newark, NJ (US)

(72) Inventors: Valery Sheverev, West Orange, NJ (US); Vadim Stepaniuk, Bloomfield, NJ (US)

(73) Assignee: Lenterra, Inc., Newark, NJ (US)

( * ) Notice: Subject to any disclaimer, the term of this patent is extended or adjusted under 35 U.S.C. 154(b) by 255 days.

(21) Appl. No.: 14/422,376

(22) PCT Filed: Nov. 7, 2014

(86) PCT No.: PCT/US2014/064545
§ 371 (c)(1),
(2) Date: Feb. 19, 2015

(87) PCT Pub. No.: WO2015/070017
PCT Pub. Date: May 14, 2015

(65) Prior Publication Data
US 2016/0041015 A1 Feb. 11, 2016

Related U.S. Application Data

(60) Provisional application No. 61/901,738, filed on Nov. 8, 2013.

(51) Int. Cl.
| | | |
|---|---|---|
| *G01F 1/30* | (2006.01) | |
| *G01F 1/74* | (2006.01) | |
| *G01D 5/26* | (2006.01) | |
| *G01F 1/28* | (2006.01) | |

(52) U.S. Cl.
CPC .............. *G01F 1/30* (2013.01); *G01D 5/268* (2013.01); *G01F 1/74* (2013.01)

(58) Field of Classification Search
CPC .... G01F 1/30; G01F 1/74; G01F 1/28; G01D 5/268; G01L 9/0042
USPC ....... 73/777, 861.71, 861.72, 861.73, 861.74
See application file for complete search history.

(56) References Cited

U.S. PATENT DOCUMENTS

| | | | | |
|---|---|---|---|---|
| 4,074,570 A | * | 2/1978 | Beilman ................. | G01P 13/02 73/178 R |
| 7,308,832 B1 | * | 12/2007 | Ifft ........................... | G01F 1/28 73/861.24 |
| 2005/0171710 A1 | * | 8/2005 | Gysling ................ | G01F 1/7084 702/54 |
| 2007/0083340 A1 | * | 4/2007 | Bailey ...................... | G01F 1/74 702/100 |

(Continued)

*Primary Examiner* — Laura Martin
*Assistant Examiner* — Suman K Nath
(74) *Attorney, Agent, or Firm* — Laurence P. Colton; Smith Tempel Blaha LLC

(57) ABSTRACT

Flow sensors, systems, and methods for continuous in situ monitoring of a rheologically complex fluid flow within a vessel, such as particulate and multiphase media for ascertaining certain fluid flow parameters, such as flow rate, dynamic viscosity, fluid density, fluid temperature, particle density and particle mass, from flow sensor measurements. The system involves a fluid flow sensor having a body member with internalized strain gauges configured to measure the deformation of certain segments of the body member. Based, at least in part, on these deformation measurements, the system is used to compute the fluid flow parameters.

2 Claims, 13 Drawing Sheets

(56) References Cited

U.S. PATENT DOCUMENTS

2013/0199305 A1\* 8/2013 Fernald .................. G01F 1/708
                                                                      73/861.18

\* cited by examiner

SENSOR FOR MONITORING RHEOLOGICALLY COMPLEX FLOWS

STATEMENT OF RELATED APPLICATIONS

This patent application claims priority on and the benefit of U.S. provisional patent application No. 61/901,738 having a filing date of 8 Nov. 2013.

BACKGROUND OF THE INVENTION

Technical Field

The present invention is directed generally to the field of flow sensors; specifically, to devices, systems and methods for continuous in situ monitoring of a rheologically complex fluid flow within a vessel (e.g., particulate and multiphase media). The present invention is functional to ascertain certain fluid flow parameters, such as flow rate, dynamic viscosity, fluid density, fluid temperature, particle density and particle mass, from flow sensor measurements.

Prior Art

In many engineering applications that deal with fluid flows, ascertaining certain fluid flow parameters from sensor measurements is fundamental. Examples of applications that deal with fluid flows include chemical processing and piping systems, food processing systems and oil pipelines. Fluid flows in such applications are typically rheologically complex (i.e., multiphase, elastic, shear thinning, fibrous, particulate and highly viscous) and/or chemically aggressive.

For example, the high shear wet granulation process widely used in the pharmaceutical industry involves a rheologically complex fluid flow. Because in-line control of the properties of the particulate fluid is crucial for producing a wet mass with specific desired characteristics, the wet granulation process depends on the accurate and precise computation of certain particulate fluid flow parameters.

Another example is related to the biotechnology industry. In certain biotechnology processes, cell culture techniques are leveraged to produce/manufacture therapeutic proteins and antibodies. An efficient and effective process analytical technology (PAT), based on reliable fluid flow sensor measurements, helps monitor cell growth in bioreactors, improves the throughput of the protein production and, therefore, reduces the cost of the drug.

Another example is related to lubricant, paint, ink or food production where the viscosity of the finished product affects product quality. Because most of these fluids are non-Newtonian and have viscosities that vary with the fluid flow velocity, dynamic in-line control of fluid viscosity is fundamental. Based on reliable fluid flow sensor measurements, the dynamic in-line control not only helps produce a final product with the correct properties but also increases the lifetime of the processing equipment. For example, if the viscosity of an ink flow falls outside the acceptable range, the dynamic in-line control can block valves and presses in the processing equipment. In the oil transportation industry, the presence of high viscosity phases (i.e., slugs) may affect the lifetime of the construction component.

Existing devices, systems and methods for ascertaining certain fluid flow parameters from in-line sensor measurements can be generally separated in two categories: non-intrusive and intrusive. The non-intrusive category may involve fluid flow interrogation with either electromagnetic or acoustic waves. The intrusive category may involve measuring devices/sensors in direct contact with a fluid flow such that the physical effect of the fluid flow on the device/sensor is leveraged to ascertain certain fluid flow parameters.

For example, prior art non-intrusive optical devices, systems and methods are capable of ascertaining certain fluid flow parameters from transparent fluids such as water and clear oils. They typically function by transmitting their optical signal through the window of a fluid flow vessel; however, in particulate and complex flows, the optical signal is scattered or absorbed by a thin layer of solid matter that is typically deposited on the surface of the window. Cleaning the window without interrupting the process significantly complicates the technology and risks contamination of the fluid.

Prior art non-intrusive acoustic devices, systems and methods are generally considered better suited for complex fluid flows but they also suffer from certain significant deficiencies. Many do not provide the desired measurement sensitivity for complex particulate fluid flows because the acoustic waves are scattered by the particles and/or the acoustic waves are reflected by the structural elements of the fluid flow vessel and/or sensor.

Prior art intrusive devices, systems and methods typically employ a sensor element directly contacting the fluid flow and comprising moving parts, e.g., a rotational meter, a turbine/propeller, a moveable vane, a mechanical oscillator, or a deformable diaphragm. These also suffer from significant deficiencies, especially in particulate and complex fluid flows, because solid matter deposits on the moving parts/joints rendering them inoperable. It is difficult and time-consuming to clean moving parts, and it also risks contamination of the fluid. Such maintenance procedures may also require interruption of the process, which may not be acceptable/practical for the specific engineering application. In addition, the moving parts introduce a risk of mechanical failure.

Vibrational viscometers are a popular prior art example in the intrusive category. A vibrational viscometer is a surface loaded system that responds to a thin layer of fluid surrounding an oscillating probe. Measurements by the vibrational viscometer depend on the surrounding fluid dampening the probe's vibration in proportion to the fluid's viscosity and density. Vibrational viscometers provide a sensitive measurement in many fluids but they often fail in particulate and multi-phase flows where deposition of the material on the probe surface changes the mechanical characteristics of the probe. Vibrational viscometers also have a relatively slow response time (e.g., several seconds) and are highly sensitive to external vibrations that can skew the measurements.

Target flow meters are another popular prior art example in the intrusive category. They operate on the principle that the amount of force generated by a fluid flow when passing a target (typically a disc) is related to the fluid flow velocity, density and viscosity. Therefore, most common target flow meters employ a target whose surface is oriented perpendicular to the direction of the fluid flow. The target typically is mounted to a stalk, and the stalk is generally affixed to a bendable balance beam configured to deflect/bend under the influence of the fluid flow. Strain gauges affixed to the balance beam, exposed to the fluid and/or recessed within a chamber, measure the degree of deflection/bend of the balance beam. Target flow meters have no moving parts, only a bending beam, and require minimal maintenance.

Prior art target flow meters, however, suffer from significant deficiencies. First, target flow meters have a very low sensitivity because of their inherent design, which must balance the need for a target with sufficient surface area with the need for a target flow meter that does not interfere with the fluid flow. Second, if the fluid flow is complex, viscous and/or particulate, particles in the fluid flow will accumulate on the target and skew the measurements. Third, the strain gauges and/or their protective means serve as a trap for particles and high viscosity components in a complex fluid flow, which alters the deflection/bend of the balance beam and skews the measurements.

For example, U.S. Pat. No. 6,253,625 issued on Jul. 3, 2001 to Samuelson et al. describes a target flow meter with a bendable stalk wherein the strain gauges are attached to the outside surface of the stalk. The strain gauges are, therefore, immersed in the fluid flow. To partially protect the strain gauges, the strain gauges are covered. Unfortunately, the cover creates a trap for fluid flow particles and high viscosity components in the complex fluid flow.

"The Design of a New Flow Meter for Pipes Based on the Drag Force Exerted on a Cylinder in Cross Flow" by C. Ruppel et al. (Transactions of the ASME, Vol. 126, July 2004, pp. 658-664) describes a device that consists of a flexible cylindrical beam mounted radially across a pipe. The reference describes that a load cell placed in a recess in the pipe wall measures the bending of the cylindrical beam by a fluid flow in the pipe. This approach eliminates the target by replacing it with a flexible cylindrical beam and requires that the cylindrical beam traverse the pipe. As in the previous example, the junction between the cylindrical beam and the pipe functions as a trap for particles and high viscosity components in a complex fluid flow. Moreover, because significant problems exist with sealing the force-sensing elements and electrical connections from the effects of the fluid flow, these devices experience a shortened lifespan. This is especially true in chemically aggressive and complex fluid flows.

U.S. Pat. No. 7,127,953 B1 issued on Oct. 31, 2006 to Yowell et al. describes a target flow meter with a rigid stalk attached to a flexible support base (which, therefore, constitutes a membrane). The strain gauges are attached to the surface of the membrane that is not exposed to the fluid flow. The movement of the rigid stalk is translated to the membrane and the deformation of the membrane is measured by the strain gauges. While this design may eliminate the disadvantage of the strain gauges being directly affected by the fluid flow, it introduces a new disadvantage: the deformation of the membrane is caused by both the drag of the fluid flow on the stalk and the fluid flow pressure.

Accordingly, there is a need for improved devices, systems, and methods for continuous in situ monitoring of a rheologically complex fluid flow within a vessel. Robust and reliable fluid flow sensors that are not susceptible to the above described deficiencies result in reduced maintenance costs, increased component service life and safer operations. It is to these needs, among others, that the present invention is directed.

BRIEF SUMMARY OF THE INVENTION

Briefly, the present invention is a system for continuous in situ monitoring of a fluid flow within a vessel. The system comprises a sensor package. The sensor package comprises a sensor. The sensor comprises a body member and a first strain gauge. The body member has an internal cavity such that the body member comprises a first external surface segment and a first internal surface segment. The body member is configured to extend into a fluid flow such that the internal cavity is isolated from the fluid flow and the first external surface segment is in contact with the fluid flow. The first external surface segment and the first internal surface segment each, respectively, are configured to deform based, at least in part, on the drag of the fluid flow. The system is such that the first internal surface segment translates the deformation of the first external surface segment. The first strain gauge is positioned in the cavity of the body member and configured to measure the deformation of the first internal surface segment. The first strain gauge is also configured to communicate a deformation measurement of the first internal surface segment.

The present invention also is a system for continuous in situ monitoring of a fluid flow within a vessel such that the first internal surface segment defines a portion of the body member at which the drag of the fluid flow produces a maximum deformation in the body member.

The present invention also is a system for continuous in situ monitoring of a fluid flow within a vessel such that the sensor package is configured to analyze the deformation measurement of the first internal surface segment and compute a fluid flow parameter based, at least in part, on the deformation measurement of the first internal surface segment.

The present invention also is a system for continuous in situ monitoring of a fluid flow within a vessel such that the computable fluid flow parameter is a force, a temperature, a velocity, a flow rate, a viscosity, and/or a density of the fluid flow.

The present invention also is a system for continuous in situ monitoring of a fluid flow within a vessel such that if the fluid flow is a particulate fluid then the computable fluid flow parameter is at least one from a group consisting of a mass and a density of a particle in the fluid flow.

The present invention also is a system for continuous in situ monitoring of a fluid flow within a vessel such that the first strain gauge is an optical strain gauge, an electrical resistive strain gauge, and/or a semiconductor strain gauge.

The present invention also is a system for continuous in situ monitoring of a fluid flow within a vessel such that the body member is spherical and/or cylindrical.

The present invention also is a system for continuous in situ monitoring of a fluid flow within a vessel. The system comprises a sensor and an interrogator. The sensor comprises a body member and a first optical strain gauge. The body member has an internal cavity such that the body member comprises a first external surface segment and a first internal surface segment. The body member is configured to extend into a fluid flow such that the internal cavity is isolated from the fluid flow and the first external surface segment is in contact with the fluid flow. The first external surface segment and the first internal surface segment are each, respectively, configured to deform based, at least in part, on the drag of the fluid flow. The body member is such that the first internal surface segment translates the deformation of the first external surface segment. The first optical strain gauge is positioned in the cavity of the body member. The first optical strain gauge is configured to measure the deformation of the first internal surface segment. The first optical strain gauge is also configured to communicate the deformation measurement of the first internal surface segment via an optical signal. The interrogator is communicatively coupled to the first optical strain gauge. The interrogator is configured to receive an optical signal communicated by the optical strain gauge and communicate the deformation measurement of the first internal surface segment.

The present invention also is a system for continuous in situ monitoring of a fluid flow within a vessel additionally comprising a controller communicatively coupled with the interrogator. The controller is configured to receive the deformation measurement of the first internal surface segment from the interrogator. The controller also is configured to analyze the deformation measurement of the first internal surface segment. The controller is configured to compute a fluid flow parameter based, at least in part, on the deformation measurement of the first internal surface segment.

The present invention also is a system for continuous in situ monitoring of a fluid flow such that the body member additionally comprises a second external surface segment, a second internal surface segment, and a second strain gauge. The second external surface segment and the second internal surface segment are each, respectively, configured to deform based, at least in part, on the drag of the fluid flow. The second internal surface segment is such that it translates the deformation of the second external surface segment. The second and the first internal surface segments are aligned by a first plane. The second strain gauge is configured to measure the deformation of the second internal surface segment.

The present invention also is a system for continuous in situ monitoring of a fluid flow such that the body member additionally comprises a third and a fourth external surface segment, a third and a fourth internal surface segment, and a third and fourth strain gauge. The third and the fourth external surface segments and the third and the fourth internal surface segments are each, respectively, configured to deform based, at least in part, on the drag of the fluid flow. The third internal surface segment translates the deformation of the third external surface segment. The fourth internal surface segment translates the deformation of the fourth external surface segment. The third and the fourth internal surface segment are aligned by a second plane. The first and the second planes intersect and define an angle. The third strain gauge is configured to measure the deformation of the third internal surface segment and communicate a deformation measurement of the third internal surface segment. The fourth strain gauge is configured to measure the deformation of the fourth internal surface segment and communicate a deformation measurement of the fourth internal surface segment.

The present invention also is a system for continuous in situ monitoring of a fluid flow such that the sensor package is configured to analyze the deformation measurements of the first, the second, the third, and the fourth internal surface segments. The system also is configured to compute a fluid flow parameter based, at least in part, on the deformation measurements of the first, the second, the third, and the fourth internal surface segments and the angle defined by the first and the second plane.

The present invention also is a system for continuous in situ monitoring of a fluid flow such that the angle defined by the first and the second plane is 90.0 degrees.

The present invention also is a method for continuous in situ monitoring of a fluid flow involving extending a sensor, at least partially, into a fluid flow within a vessel. The method also involves detecting, by the first strain gauge, a deformation of the first internal surface segment. The method also involves transmitting, by the first strain gauge, a deformation measurement of the first internal surface segment. The method also involves analyzing the deformation measurement of the first internal surface segment. The method also involves computing a fluid flow parameter based, at least in part, on the deformation measurement of the first internal surface segment.

The present invention also is a method for continuous in situ monitoring of a fluid flow additionally involving modifying the fluid flow.

The present invention also is a method for continuous in situ monitoring of a fluid flow additionally involving detecting, by the second strain gauge, a deformation of the second internal surface segment. The method also involves detecting, by the third strain gauge, a deformation of the third internal surface segment. The method also involves detecting, by the fourth strain gauge, a deformation of the fourth internal surface segment. The method also involves communicating a deformation measurement of the first, the second, the third, and the fourth internal surface segment. The method also involves analyzing the deformation measurement of the second, the third, and the fourth internal surface segment. The method also involves comparing the deformation measurements of the first and the second internal surface segment. The method also involves comparing the deformation measurements of the third and the fourth internal surface segment.

The present invention also is a method for continuous in situ monitoring of a fluid flow additionally involving calculating a difference between the deformation measurements of the first and the second internal surface segment. The method also involves calculating a difference between the deformation measurements of the third and the fourth internal surface segment. The method also involves computing the fluid flow parameter, based at least in part, on the difference between the deformation measurements of the first and the second internal surface segment and the difference between the deformation measurements of the third and the fourth internal surface segment.

The present invention also is a method for continuous in situ monitoring of a fluid flow additionally involving calculating a first vector component of the fluid flow parameter based, at least in part, on the angle defined by the first and the second plane and the deformation measurements of the first and the second internal surface segment. The method also involves calculating a second vector component of the fluid flow parameter based, at least in part, on the angle defined by the first and the second plane and the deformation measurements of the third and the fourth internal surface segment.

The present invention also is a method for continuous in situ monitoring of a fluid flow additionally involving computing the differential signal, from the first and the second strain gauge, based, at least in part, on the difference between the deformation measurements of the first and the second internal surface segment. The method also involves computing the average signal, from the first and the second strain gauge, based, at least in part, on the difference between the deformation measurements of the first and the second internal surface segment. The method also involves computing the deformation of the first surface segment that is due to the drag of the fluid flow relative to the thermal expansion of the first internal surface segment.

The present invention also is a method for continuous in situ monitoring of a fluid flow additionally involving detecting, by a reference sensor, the temperature of the fluid flow. The method also involves transmitting, by the reference sensor, a temperature measurement of the fluid flow. The method also involves computing the thermal expansion of the first internal surface segment that is due to the temperature of the fluid flow relative to the drag of the fluid flow.

These features, and other features and advantages of the present invention will become more apparent to those of ordinary skill in the relevant art when the following detailed description of the preferred embodiments is read in con-

DETAILED DESCRIPTION OF PREFERRED EMBODIMENTS

Figure 1:
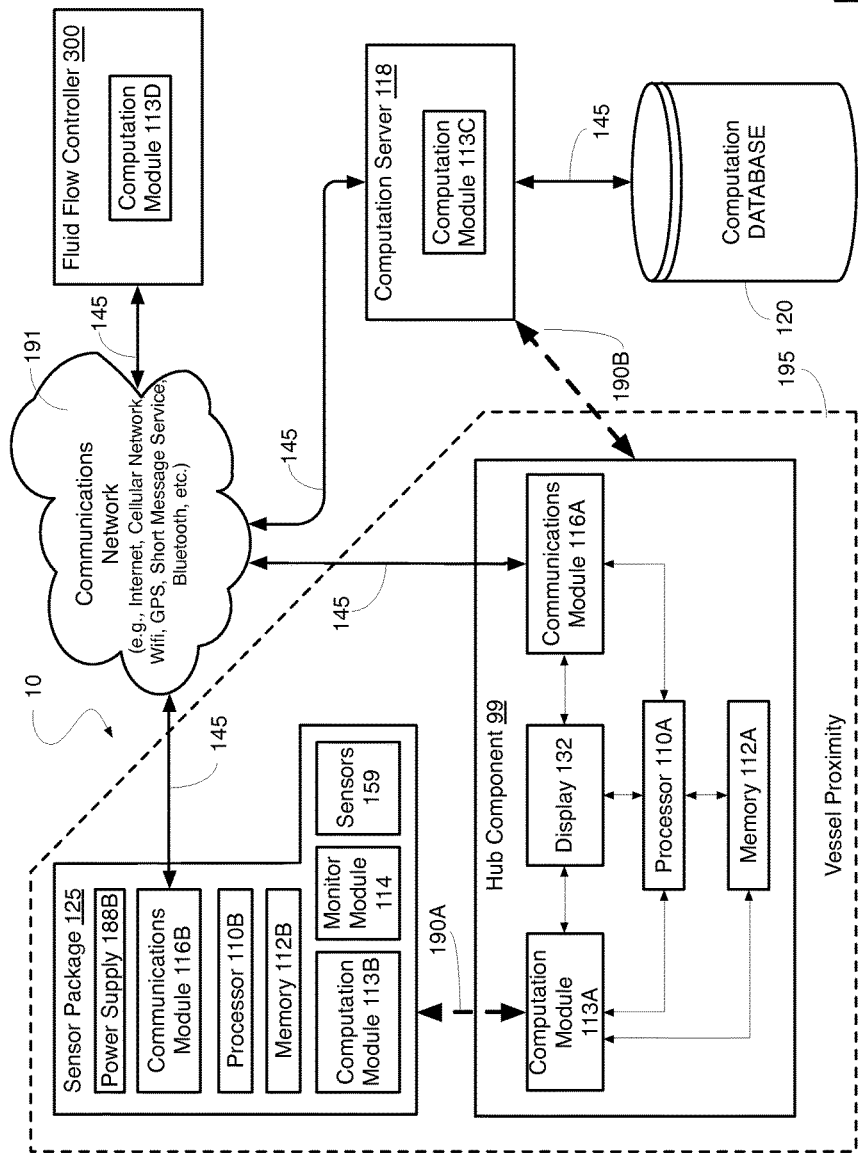
FIG. 1 is a high level functional block diagram illustrating an exemplary architecture of a system for continuous in situ monitoring of a fluid flow.

Aspects, features and advantages of several exemplary embodiments of systems and methods for continuous in situ monitoring of a fluid flow within a vessel are described. The systems and method will become better understood with regard to the following description in connection with the accompanying drawings. It is apparent to one having ordinary skill in the art that the described embodiments provided herein are illustrative only and not limiting, having been presented by way of example only.

As used in this description, the terms "component," "database," "module," "system," and the like are intended to refer to a computer-related entity, either hardware, firmware, a combination of hardware and software, software, or software in execution. For example, a module may be, but is not limited to being, a sensor, a process running on a processor, a processor, an object, an executable, a thread of execution, a program, and/or a computer. By way of illustration, both an application running on a sensor package and the sensor package may be a system.

Certain embodiments of systems and methods for continuous in situ monitoring of a fluid flow within a vessel involve a sensor. Embodiments of the sensor may provide a base element, adapted for fastening with a structural component (e.g., the internal walls of a vessel), and a flexible hollow body member. The hollow body member is coupled to the base element directly or indirectly via a stalk. The outer surface of the hollow flexible member is configured to be extended and brought into contact with a fluid flow. A plurality of strain gauges affixed to the inner wall surface of the hollow body member measure/monitor a deformation (e.g., bending, stretching, compressing) of an internal wall segment of the hollow body member.

The undeformed geometry/shape/configuration of the hollow body member is a hollow sphere, a hollow cylinder, and/or a combination of various 3D shapes having streamlined geometries relative to the fluid flow. The inner surface of the hollow body member is isolated from the fluid flow. The outer surface of the hollow body member, exposed to the fluid flow, are composed and configured to withstand the chemical effects of the fluid and do not contaminate the fluid. The outer surface material is stainless steel; however, various materials and/or surface linings/treatments known to one having ordinary skill in the art are or can be employed, e.g., Teflon® brand of synthetic polymer, plastics, polymers, organic compounds, and/or hydrophobic/hydrophilic layers.

The sensor is functional with a computation module to process the deformation measurements (related to a change in morphology of the hollow body member) and compute fluid flow parameters (related to the drag force of the fluid flow that changes the morphology of the hollow body member). Exemplary parameters of the fluid flow are the flow rate, the velocity, the viscosity, the density and the temperature.

The drag force exerted by the fluid on the hollow body member causes deformation of the geometry/shape/configuration of the hollow body member. For an example, a spherical hollow body member changes morphology to a droplet shape elongated downstream. For another example, a cylindrical hollow cylinder extended across the fluid flow bends so that the downstream wall of the cylinder undergoes compression (reduction in its length) and the upstream wall stretches (increases its length).

The deformation of the hollow body member's walls are monitored by any conventional sensing technique(s), e.g., optical, electrical resistive, or semiconductor strain gauge techniques. An internal surface segment of the hollow body member is monitored by fiber optic-based intrinsic optical resonance techniques such as Fiber Bragg Grating (FBG) strain gauges and/or Whispering Gallery Mode (WGM) stress gauges for a deformation. The sensor has at least one pair of FBG strain gauges affixed to the inner surface of the hollow body member for the purpose of monitoring two separate but related internal surface segments.

The sensor is applicable in a variety of open and closed systems that include process systems, e.g., chemical and biological process systems, water pipeline systems, tanks and reactor vessels, broad range piping and conduit systems (water, fuel, oil, etc.), particles (powders), and multiphase (mixtures of liquid, gas, and solid phases) fluid flows. The sensor is applicable to many processes, including, for example, industrial chemical, water, electric power generation, pulp and paper, heat exchanger, incinerator, and fossil fuel applications.

When not extended into a fluid flow, the sensor is in its undeformed state and a stress gauge records a deformation measurement of the first mechanical state of the hollow body member at a particular inner surface segment. When extended into a fluid flow, the sensor is in a deformed state and a stress gauge records a deformation measurement of the second mechanical state of the hollow body member at the particular inner surface segment. The difference between the deformation measurements is therefore indicative of the physical effects on the hollow member by the drag of the fluid flow.

The measurement range and sensitivity of the sensor to the fluid flow drag force is customizable based, at least in part, on the undeformed geometry of the hollow body member, the composition and physical properties of the materials of the hollow body member, and the surface texture/pattern/configuration of the external surface of the hollow body member. For a spherical hollow body member, customization is based, at least in part, on variations in the outer and inner diameter of the external and internal surfaces. For a cylindrical hollow body member, customization is based, at least in part, on variations in the length of the hollow body member, and variations in the outer and inner diameter of the external and internal surfaces. Customization also is based on variations in the density and the Young's modulus of the materials of the hollow body member, and variations in the texture/pattern/configuration of the external surface of the hollow body member. Furthermore, customization also is based on dynamic control of the elastic properties of the flexible hollow member, e.g., the sensor being filled with a gas, a liquid, a plasma, a silicon, or an oil.

The sensor provides minimal intrusion to the fluid flow. The sensor also does not have moving parts or cavities along the outer surface of the hollow body member wherein particles and viscous components of fluid flow would accumulate. Furthermore, the sensor's stress gauges and other circuitry/wiring/means of communicatively coupling are isolated/protected from direct exposure to the fluid flow by being positioned within the internal cavity of the hollow body member.

Certain embodiments of systems and methods for continuous in situ monitoring of a fluid flow within a vessel are directed towards a sensor, as described above and further described herein, (also known as a fluid flow sensor) in a system. The fluid flow sensor is configured to at least take deformation measurements of an internal surface segment along the inner surface of the cavity within a body member.

A portion of the system is placed proximate to a vessel with a fluid flow, with the sensor being extended, at least partially, into the fluid flow from this portion. The portion also may include a computational module and a monitoring module that are within the proximity of the vessel but that are separated and isolated from the fluid flow. This portion of the system has a durable encasement for any component proximate to the vessel; however, the encasement allows the sensor to extend uninterruptedly into the fluid flow.

The system includes components similar to, or entirely distinct from, the fluid flow sensor to monitor properties of a fluid flow or any other environment. The system comprises a non-intrusive acoustic sensor, a non-intrusive optical sensor, a rotational meter, a turbine/propeller, a moveable vane, a mechanical oscillator, a deformable diaphragm, vibrational viscometers, target flow meters, a vibration sensor, an accelerometer, a displacement sensor, a barometer, and/or a fluid flow temperature probe. The system is configured to process and leverage the various sensory inputs to ascertain certain fluid flow parameters. All of the sensory readings are taken in real time and communicated to various system components as needed.

The system includes a user interface comprising a monitor/screen configured to render continuous information to a user. The system is equipped with programmable alarms/signals that leverage, at least in part, the screens if any sensory input deviates from a preset value/range. The alarms/signals are also silent and communicated via the components of the system. Notably, the system comprises a computing device, or hub device, in communication with two or more sensors, thereby providing for a single command station to monitor various disparate system components.

The system's hub device is communicatively coupled to one or more sensors and other system components. Communication is established via Bluetooth® brand of telecommunication or any other short wave radio signal or optical communications technique. The system's hub device stores sensory inputs, outputs sensory measurements (and the processing products therefor), outputs data to a user in real time, transmits collected data to a remote device such as a server, or any combination thereof. Major components of the system comprise onboard memory storage as well as wired, wireless, and/or optical transmitter(s) in order to store and/or send real time output data.

Certain embodiments of systems and methods for continuous in situ monitoring of a fluid flow within a vessel involve an algorithm beginning at time t. A fluid flow sensor is extended into the fluid flow and the fluid flow sensor takes readings at either predefined intervals or intervals dependent on an external/internal condition. The pairs/groupings of stress gauges of the fluid flow sensor take deformation measurements of their respective internal surface segments.

Referring now to the drawings, wherein the showings are for purposes of illustrating the various embodiments of the present disclosure only and not for purposes of limiting the same, FIG. 1 illustrates a high level functional block diagram of an exemplary architecture of a system 10 for continuous in situ monitoring of a fluid flow within a vessel. A vessel proximity 195 includes a hub component 99 in the form of a computing device and a sensor package 125. The vessel proximity 195 envisions a sensor package 125 in wireless communication via a link 190A with a hub component 99 that is in the vicinity of a vessel with a fluid flow. For example, a vessel may have a sensor package 125 attached such that the sensor 159 of the sensor package traverses the walls of the vessel and extends, at least partially, into the fluid flow. The computing device 99 is one example of a hub component that is positioned proximate to the vessel but that is also communicatively coupled to the sensor package 125, as well as multiple other sensor packages. The plurality of sensor packages are engaged with the vessel at various positions along the length of the vessel and, thus, within the vessel proximity 195. Another example of the hub component 99 and the sensor package 125 being within the vessel proximity 195 include the sensor package 125 being engaged with the vessel and the hub component 99 being monitored by a nearby user.

Notably, although the FIG. 1 illustration depicts a sensor package 125 and a hub component 99 within a common vessel proximity 195, it is understood that not all embodiments of the system require a hub component 99 to be within a vessel proximity. That is, it is envisioned that certain functionalities of the system are implemented via a remote computing device such as a computation server 118. In such embodiments, the sensor package 125 communicates with the computation server 118 via a communications network 191 without need for a hub device 99. In other embodiments, a sensor package 125 communicates with either or both of the computation server 118 and the hub component 99. Similarly, in some embodiments, the hub component 99 transmits data to and/or from computation server 118 via link 190B which is implemented over the communications network 191.

In the FIG. 1 embodiment, the sensor package 125 is shown to include a power supply 188B, a communications module 116B (for establishing communications with either or both of hub component 99 and computation server 118 via communications network 191), a processor 110B, and a memory 112B. The sensor package 125 also includes a plurality of sensors 159 (which themselves include any combination of a fluid flow sensor, a non-intrusive acoustic sensor, a non-intrusive optical sensor, a rotational meter, a turbine/propeller, a moveable vane, a mechanical oscillator, a deformable diaphragm, vibrational viscometers, target flow meters, a vibration sensor, an accelerometer, a displacement sensor, a barometer, and/or a fluid flow temperature probe, etc.), a monitor module 114 (for monitoring the sensors 159), and a computation module 113B (for processing the sensory data from the sensors 159).

Similar to the sensor package 125, the hub component 99 includes a communications module 116A (for transmitting and/or receiving communications over the network 191 from the computation server 118 and/or the sensor package 125), a processor 110A, a memory 112A, and a computation module 113A. The hub component 99 also includes a display 132 for rendering one or more outputs to a user. The computation server 118 as includes a computation module 113C.

Notably, not all of the components depicted in the FIG. 1 illustration are required in all system embodiments. That is, it is envisioned, for example, that a certain embodiment includes a single computation module 113A in a hub component while another embodiment includes computation modules 113 in each of the sensor package 125, the hub component 99, and the computation server 118. As such, it is understood from the FIG. 1 illustration that all of certain modules, or a portion of a certain module, may or may not reside in a certain component of the system.

As described above, the sensor package 125 is in proximity and engaged with a vessel such that the sensors 159 monitor their respective fluid flow and/or non-fluid flow properties/characteristics. Notably, although not shown in the FIG. 1 illustration, it is envisioned that certain sensors, such as ambient temperature sensors, may reside within hub component 99. The monitor module 114 monitors/interrogates the sensors and forwards the collected data to the computation module 113B according to instructions dictated by the computation module 113B and/or the other system 10 components. For example, the computation module 113B receives deformation measurement readings from the sensors 159 (specifically the fluid flow sensor) and, based at least in part on the deformation measurements, computes certain fluid flow parameters.

The data generated by the sensors 159, collected by the monitor module 114 and managed by the computation module 113B, are stored locally in the memory 112B of the sensor package 125 and/or transmitted to the hub component 99 and/or the computation server 118. Once received by the hub component 99 and/or the computation server 118, the computation modules 113A, 113C may use the measurement data to compute/process/leverage the information. Notably, it is envisioned that certain system embodiments are comprised completely within a sensor package 125, while other system embodiments comprise a minimalist sensor package 125 including only those components needed for collecting measurements and transmitting the measurements to other components in the system 10.

In certain system embodiments, data generated by the sensors 159 and transmitted to the computation server 118 are stored in a database 120 for later download and utilization. Similarly, it is envisioned that either or both of the sensor package 125 and the hub component 99 include a computation database 120 in their respective memories 112.

The exemplary embodiments of the hub component 99 and the sensor package 125 envision remote communication, real-time software updates, extended data storage, etc., and may be leveraged in various configurations by the users of system 10. Advantageously, embodiments of the hub components 99 and/or the sensor packages 125 are configured for communication via a computer system as depicted in FIG. 1. This involves leveraging communications networks 191 including, but not limited to cellular networks, PSTNs, cable networks, Wi-Fi® brand of communications, and the Internet for, among other things, software upgrades, content updates, database queries, data transmission, etc. Other data communications means that are use in connection with the hub component 99 and/or the sensor package 125, and accessible via the Internet or other networked system, will occur to one having ordinary skill in the art.

The illustrated computer system 10 comprises a computation server 118 that is communicatively coupled to a network 191 comprising any or all of a wide area network ("WAN"), a local area network ("LAN"), the Internet, or a combination of other types of networks. It is understood that the term server 118 refers to a single server system or multiple systems or multiple servers. The server 118 is coupled to a computation database 120, as described above. The computation database 120 stores various records related to, but not limited to, historical sensor reading data, computation algorithms and methods, filters/rules algorithms, user preferences, previously calculated fluid flow parameters, trends, etc.

The computation server 118 is communicatively coupled to the network 191. The computation server 118 communicates through the network 130 with various different hub components 99 and sensor packages 125 associated with the system 10. Each hub component 99 and/or each sensor package 125 runs/executes network communication software or functionalities to access the computation server 118 and its various system applications (including computation module 113C). The hub component 99 or the sensor package 125, as well as other components within system 10 (such as, but not limited to, a wireless router), are communicatively coupled to the network 191 by various types of communication links 145. These communication links 145 may comprise wired as well as wireless and/or optical links. The communication links 145 allow the hub component 99 or the sensor package 125 to establish virtual links 190 with the server 118 and/or each other. While a virtual link 190B, for example, is depicted between the server 118 and the hub device 99, an actual wired/wireless/optical link 145 may exist between the server 118 and the hub device 99. It is envisioned that this link 145 is used to relay data to the computation server 118 from the hub component 99 and/or the sensor package 125 as a uni-directional communications channel or as a bi-directional communications channel.

It is envisioned that the display 132 comprises any type of display device known to one having ordinary skill in the art such as a liquid crystal display ("LCD"), a plasma display, an organic light-emitting diode ("OLED") display, a touch activated display, and a cathode ray tube ("CRT") display, a brail display, an LED bank, and a segmented display. The hub component 99 executes/runs or interface with a multimedia platform that is part of a plug-in for a network browser, for example.

The communications module 116 comprises wireless communication hardware such as, but not limited to, a Wi-Fi_____33® brand of communications card or near field communications (NFC) card for interfacing with the system 10 components. Further, the communications module 116 includes a cellular radio transceiver to transmit collected sensory data as well as other information to other components of the system. One having ordinary skill in the art recognizes that a communications module 116 includes application program interfaces to processor 110 as is understood by one having ordinary skill in the art.

A fluid flow controller 300 is also a component of the system 10. It leverages the communications network 191 to communicate with the various other components of the system 10. The fluid flow controller 300 comprises a computation module 113D with all of the same features, aspects and functionalities described herein. The fluid flow controller 300 represents a portion of a fluid flow process system (not depicted) that regulates the fluid flow properties in the vessel, i.e., fluid velocity, mixture composition, etc. One having ordinary skill in the art understands that the fluid flow controller is an intermediate component in a complex fluid flow process system that comprises valves, ports, pumps, motors, grates, sieves, etc. The fluid flow controller 300, based at least on computation module 113D, is configured to receive sensory data transmitted across the components of the system 10, analyze that data to compute various fluid flow parameters and leverage/transmit that information to other components of a fluid flow process system such that the fluid flow is regulated/modified/corrected by the fluid flow process system. The fluid flow controller 300 is therefore an intermediate component in a complex mechanical and computational regulatory system for the fluid flow in the vessel.

Figure 2A:
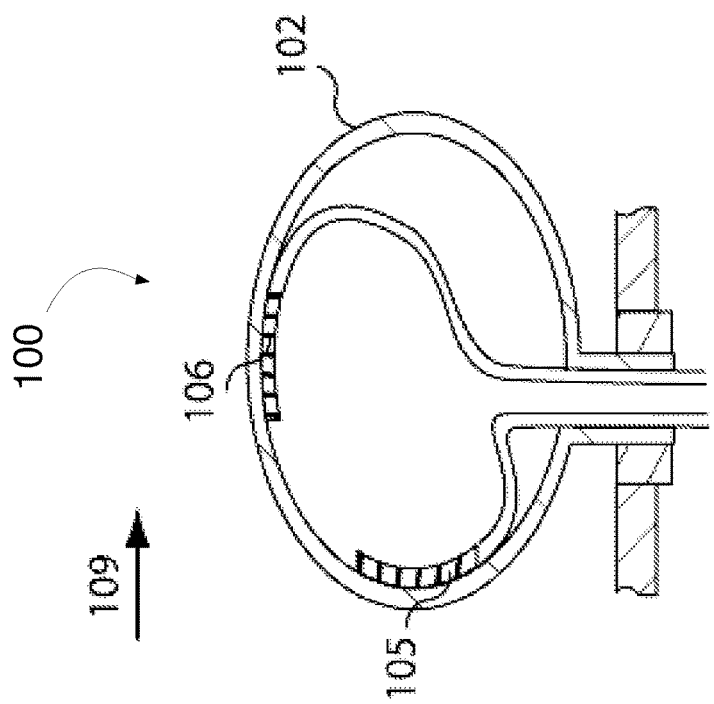
FIG. 2A is a cross-sectional view of one embodiment of a spherical fluid flow sensor; specifically, an undeformed fluid flow sensor.
Figure 2B:
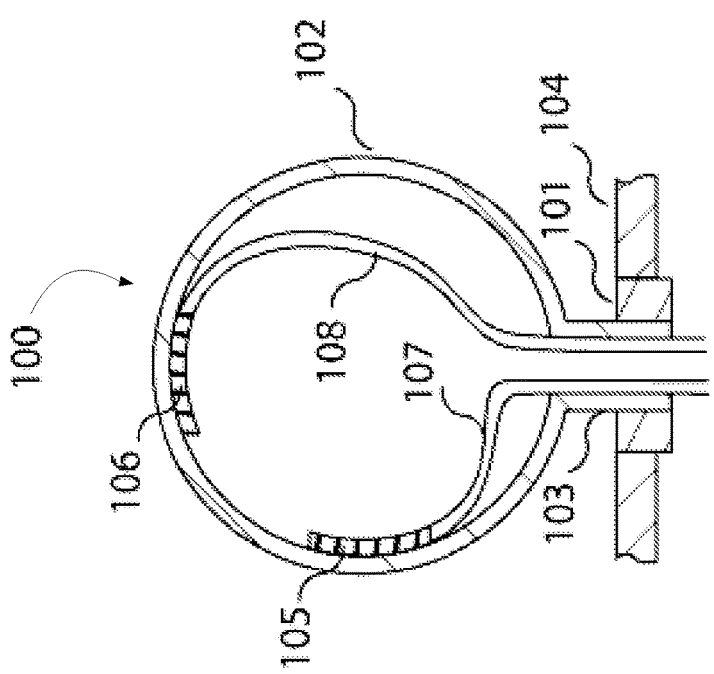
FIG. 2B is a cross-sectional view of one embodiment of a spherical fluid flow sensor; specifically, a deformed fluid flow sensor.

FIGS. 2A and 2B are side cross-sectional views of one embodiment of a spherical fluid flow sensor 100; specifically, the FIG. 2A view is of an undeformed sensor 100 and the FIG. 2B view is of a deformed sensor 100 within a fluid flow 109. The sensor 100 comprises a base 101 and a body member 102 connected to the base 101 via a rigid stalk 103. The stalk 103 is firmly attached at one end to the base 101 and its second end is fused with the body member 102 in a manner that prevents fluid from penetrating inside the cavity of the stalk 103 and the body member 102. It is envisioned that the stalk is resistant to deformation to ensure that all fluid flow drag effects are reflected primarily in the morphology of body member 102.

Base 101 is positioned through a wall 104 of a structural component holding the fluid flow, such as a vessel or pipe, whose parameters are to be monitored. As such, the spherical member 102 is in contact with the fluid flow. Two optical FGB strain gauges 105, 106 are affixed to the inner surface of the body member 102 to monitor the deformation of their respective internal surface segments. The gauges 105, 106 are affixed using an adhesive; however, any means for coupling the gauges 105, 106 to the inner surface is envisioned, e.g., welding, mechanical fasteners, chemical bonding, electromagnetic physical attraction (magnetism).

Optical fibers 107, 108 communicatively couple the strain gauges 105, 106, respectively, to an appropriate optical interrogator (not depicted) that collects information about the length of each gauge. It is envisioned that an optical interrogator, as is understood by one having ordinary skill in the art, is one embodiment of a monitor module 114 of FIG. 1.

In FIG. 2A, the shape of the body member 102 is spherical when undeformed and when not under the influence of the drag of the fluid flow 109. FIG. 2B depicts the body member 102 when deformed by the fluid flow 109. Under the influence of the fluid flow 109 (specifically the drag of the fluid flow 109 as compared to the pressure of the fluid flow 109) the body member 102 becomes elongated along the direction of the fluid flow 109. The body member 102 deforms to become more streamlined, i.e., the morphology of the body member 102 changes based, at least in part, on the friction/drag of the fluid flow 109. In the morphology depicted by FIG. 2B, the internal surface segment corresponding to the strain gauges 105, 106 stretch (experience less compression) as compared to their undisturbed state as depicted in FIG. 2A. It is, of course envisioned, that the internal surface segment corresponding to the strain gauges 105, 106 will compress under other environmental circumstances.

The more streamlined morphology of the body member 102 results in changes in the physical state of various external surface segments, which are ultimately translated by corresponding internal surface segments of the body member 102. The strain gauges 105, 106 are consequently configured to measure the deformation of certain internal surface segments and to communicate the deformation measurements to other components of the system 10.

Figure 3B:
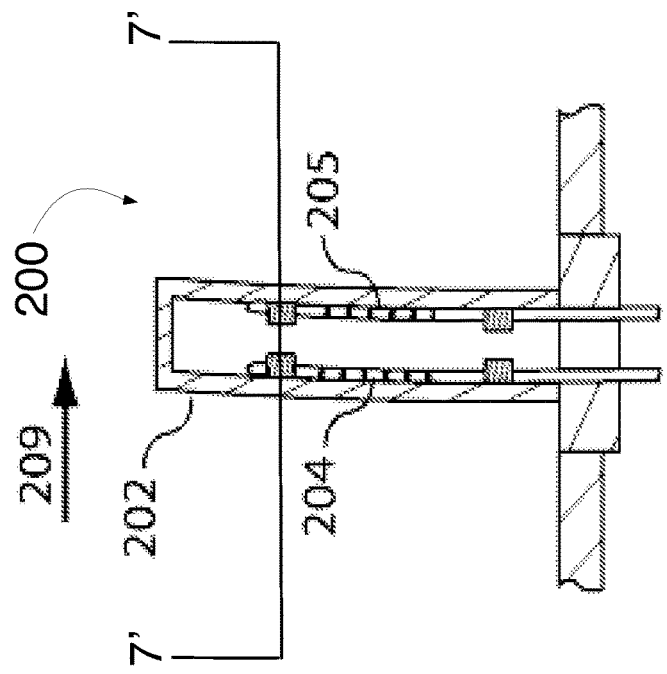
FIG. 3B is a cross-sectional view of one embodiment of a cylindrical fluid flow sensor; specifically, a deformed fluid flow sensor.
Figure 3A:
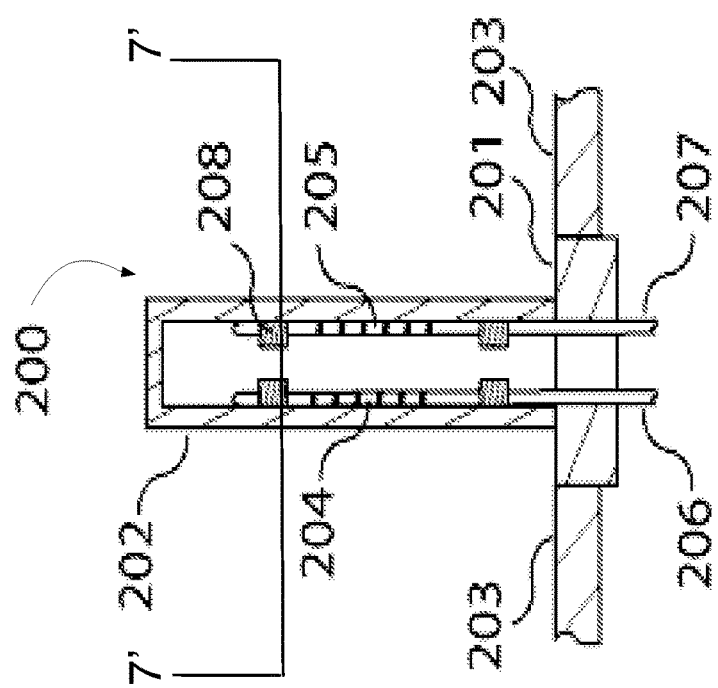
FIG. 3A is a cross-sectional view of one embodiment of a cylindrical fluid flow sensor; specifically, an undeformed fluid flow sensor.

FIGS. 3A and 3B are side cross-sectional views of one embodiment of a cylindrical fluid flow sensor 200; specifically, the FIG. 3A view is of an undeformed sensor 200 and the FIG. 3B view is of a deformed sensor 200 within a fluid flow 209. The sensor 200 comprises a base 201 and a body member 202. The body member 202 is fused, at one end, to the base 201 and, at the second end, is sealed such that the internal cavity of the body member 202 is isolated from the fluid flow 209. It is envisioned that the body member 202 is one contiguous piece or is constructed from various component pieces; however, regardless of its fabrication, the resulting hollow body member 202 is one cohesive component with a substantially flush external surface area. This ensures that any seams between the component pieces of the hollow body member 202 are minimized to avoid any mechanical failures/fissures/leaks into the internal cavity of the hollow body member 202.

The base 201 is positioned through a wall 203 of a structural component holding the fluid flow 209. As such, the external surface of the body member 202 is in contact with the fluid. One having ordinary skill in the art understands that the base 201 is engaged with the wall 203 such that the fluid containment function of the vessel is maintained. It is envisioned that the base 201 is configured such that any leaks between the junction of the base 201 and the wall 203 do not penetrate the internal cavity of the body member 202 and/or contact the components of the system 10 positioned within the internal cavity or proximate to the vessel (including any means for communicating information between components, e.g., any optical fibers).

Two optical FGB strain gauges 204, 205 are communicatively coupled to the optical fibers 206, 207 respectively. The optical FGB strain gauges 204, 205 are engaged to internal surface segments on opposite internal surfaces (i.e., the optical FGB strain gauges 204, 205 lie on the same axial traversing plane of the body member 202). Optical fibers 206, 207 communicatively couple strain gauges 204, 205 to an optical interrogator (not depicted) that obtains deformation measurements from each correlated pair/group of internal surface segments.

FIG. 3A depicts an undeformed body member 202, and FIG. 3B depicts the deformation of the body member 202 in a fluid flow 209. Assuming that the fluid flow force is uniform along the length of the body member 202, a deformation of the body member 202 is due to uniformly distributed load ω (N/m) defined by:

$$y = \frac{\omega x^2}{24EI}(x^2 + 6l^2 - 4lx) \qquad \text{Equation 1}$$

where x is the coordinate along the axis of the body member 202 (the fixed end corresponds to x=0), y is the axis deformation at coordinate x, E is the Young's modulus of the material of the body member 202, I is the momentum of inertia of the body member 202, which for a substantially hollow cylindrical beam is defined by:

$$I = \frac{\pi}{4}(r_o^4 - r_i^4) \qquad \text{Equation 2}$$

where $r_o$ is the outer radius and $r_i$ is the inner radius, l is the length of the beam. The deflection of the tip of the beam is found via:

$$\delta_{max} = \frac{\omega l^4}{8EI} \qquad \text{Equation 3}$$

Therefore, the deformation measurements of the body member 202, specifically, of the internal surface segments that deform to produce the deformed body member 202 illustrated in FIG. 3B, carry information about the drag exerted by the fluid flow 209 on the body member 202. Assuming no temperature effect, when the body member 202 deforms, the upstream strain gauge 204 stretches (increases its length by an extra length α) and the downstream strain gauge 205 compresses (decreases its length by the same distance α). The strain gauges 204, 205 are affixed in a certain position $x_o$ along the length of the length of body member 202 where the relative change of its length, $$\frac{\Delta L}{L}(x)$$

(L is the length of the strain gage), is at a maximum. For a uniform cylinder, this position is at the middle point (that is $x_0$=0.5·l).

Both the upstream and the downstream internal surface segments of the body member 202 also stretch or compress due to thermal expansion or contraction if the temperature of the body member 202 varies. Therefore, deformation measurements from the respective strain gauges 204, 205 also contain information about the effects of the thermal expansion/contraction based, at least in part, on the fluid flow. If the change in the length of the internal surface segments due to thermal expansion/contraction is β, the total change in the length of the internal surface segment associated with the strain gauge 204 is $\gamma_u$=α+β and the length of the internal surface segment associated with the strain gauge 205 is $\gamma_d$=−α+β. Therefore, independently measuring $\gamma_u$ and $\gamma_d$ allows the system 10 to separately compute the stretch due to the drag of the fluid flow (by computing the differential signal from the strain gauges 204, 205 [$(\gamma_d-\gamma_u)$/2]) and the stretch due to thermal expansion (by computing the average signal from the strain gauges 204, 205 [$(\gamma_d+\gamma_u)$/2]).

The differential signal $(\gamma_d-\gamma_u)$/2=α is proportional to deflection $\delta_{max}$, which is proportional to the drag by the fluid flow 209 on the body member 202. The average signal $(\gamma_d+\gamma_u)$/2=β is proportional to the thermal expansion/contractions of the body member 202. Computing specific parameters for the force and the temperature effects of the fluid flow 209 on the body member 202, and corresponding them to a particular set of measurables $\gamma_d$ and $\gamma_u$, is possible based, at least in part, on modeling or calibration, as is understood by one having ordinary skill in the art.

It is envisioned that the system 10 compensates, in its computations, for the thermal expansion/contraction of the body member 202 by leveraging the sensory measurements from at least one temperature sensor positioned in the immediate vicinity of the body member 202. Such a reference sensor provides real-time temperature measurements of the fluid flow, which is used to compute the expansion/contraction due to temperature change, β, and/or the expansion/contraction due to fluid flow force, α. This type of algorithmic analysis is understood by one having ordinary skill in the art.

Figure 4:
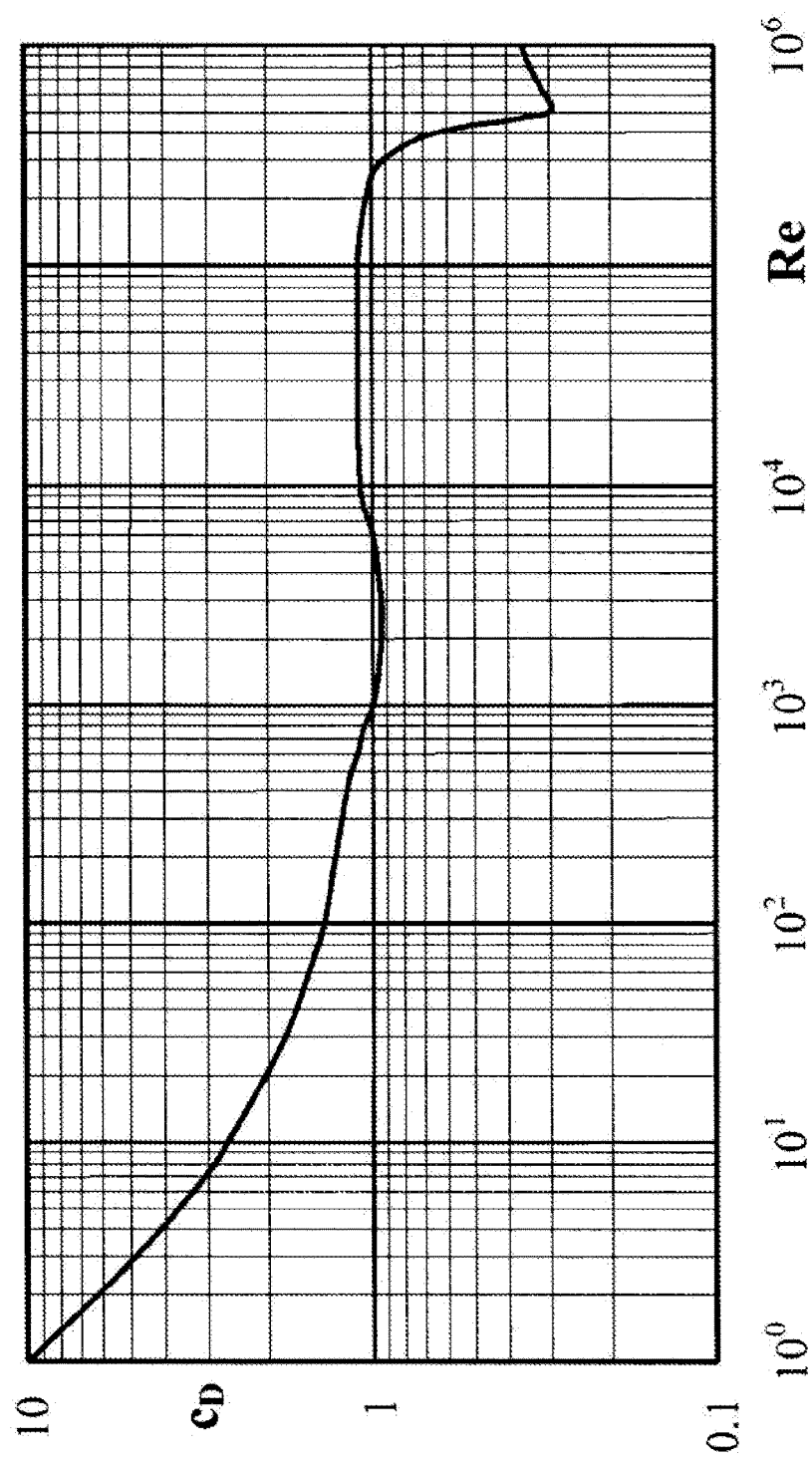
FIG. 4 is a graphical representation of the dependence of the drag coefficient on Reynolds number for a cylindrical fluid flow sensor in a fluid flow.

Returning to the explanation of FIG. 3B, the force acting on the body member 202 in the fluid flow 209 is defined by:

$$F = \frac{C_d}{2} A \rho v^2 \qquad \text{Equation 4}$$

where $C_d$ is a drag coefficient of a cylinder, A=2$r_o$l defines the cross section of the cylinder, ρ is the fluid density, v is the flow velocity, $C_d$ depends on the Reynolds number, $$Re_d = \frac{2r_o v \rho}{\mu} \qquad \text{(FIG. 4)}$$

and μ is the dynamic viscosity. By knowing the fluid viscosity and density, the system 10 has the information necessary to compute the fluid velocity and volumetric flow rate. Inversely, by knowing the flow rate of the fluid flow, the system 10 has the information to compute the fluid viscosity and the density. Therefore, the sensor 200 allows for the system 10 to gather sensory measurements from which certain fluid flow parameters are computed, monitored and tracked over time.

Figure 5:
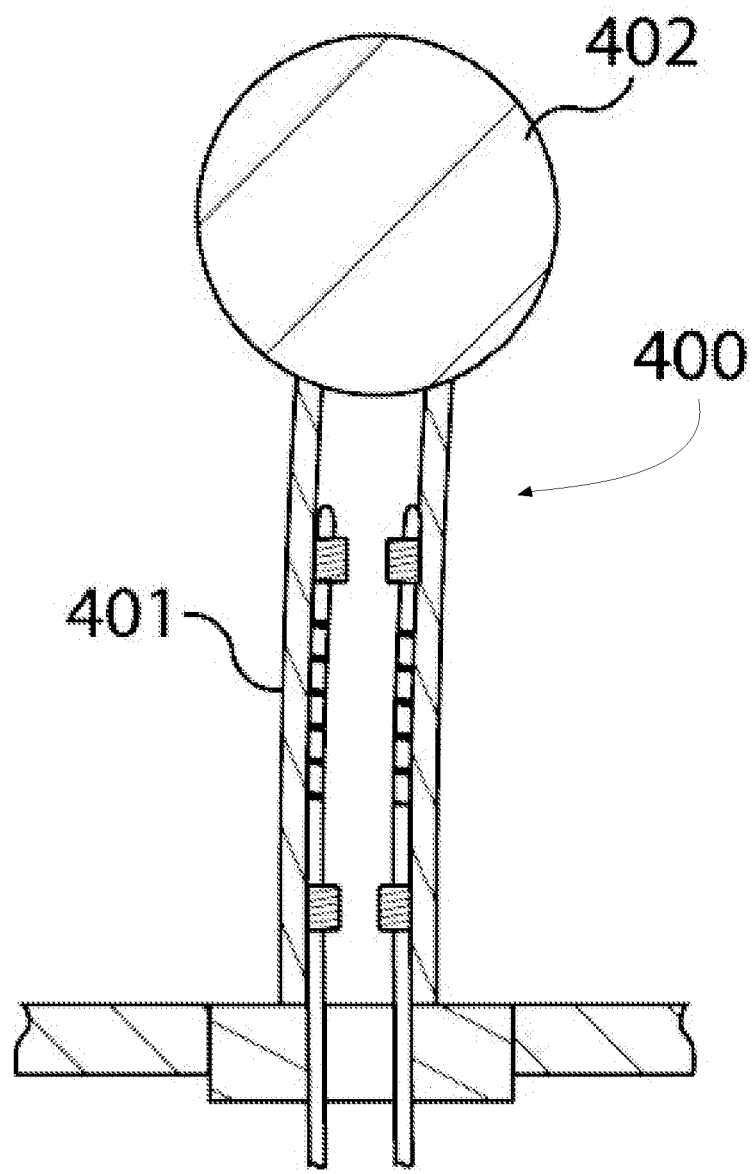
FIG. 5 is a cross-sectional view of one embodiment of a body member of a fluid flow sensor; specifically, a deformed fluid flow sensor.

FIG. 5 is a side cross-sectional view of one embodiment of a body member for a sensor 400; specifically, the FIG. 5 view is of a deformed sensor 400 within a fluid flow (not depicted). The sensor 400 comprises a body member 401 with a mixed shape/geometry/configuration. The sensor 400 includes a spherical portion 402 that facilitates the deformation of the body member 401 based, at least in part, on the drag of the fluid flow. Therefore, the spherical portion 402 affords the sensor 400 with additional external surface area on which the drag of the fluid flow can act.

The spherical portion 402 is depicted as having no internal cavity; however, it is envisioned that the spherical portion 402 is its own discrete body member (such as the body member 101 of FIGS. 2A-2B). This type of configuration allows the external surface of the body member 401 to deform differently along the cylindrical portion (essentially, a cylindrical hollow body member such as the body member 202 of FIGS. 3A-3B) as compared to the spherical portion 402. One having ordinary skill in the art understands that the differences between a spherical body member (as described herein) and a cylindrical body member (as described herein) affords the system 10 with different sources of deformation measurements, which can provide different and/or complimentary information about the parameters of the fluid flow.

Figure 6:
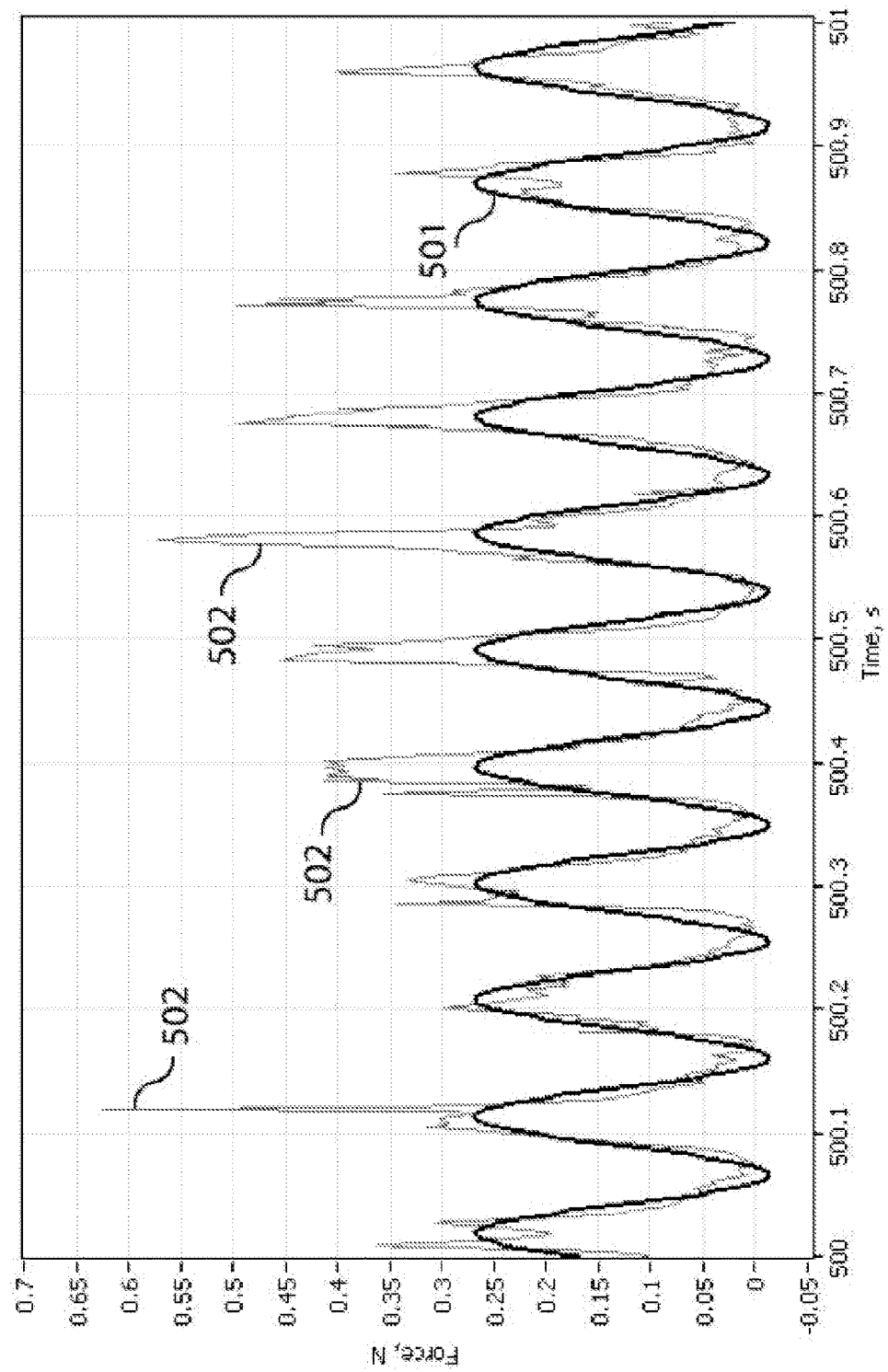
FIG. 6 is a graphical presentation of a fluid flow's force over time as computed by a system based, at least in part, on the deformation measurement signals from a fluid flow sensor.

FIG. 6 is a graphical presentation of a fluid flow's force over time as computed by the system 10 based, at least in part, on the deformation measurement signals from a fluid flow sensor. As described herein, in a particulate fluid flow, the body member of a fluid flow sensor not only experiences deformation based, at least in part, on the drag of the fluid flow but also based on the recurring impacts of particles/particle agglomerates in the fluid flow. In such occasions, the fluid flow sensor provides measurements that are computed by the system 10 into a pulsed response as depicted in FIG. 6.

More specifically, FIG. 6 illustrates the force of a particulate fluid flow 209 as exerted on the body member 202 of the sensor 200 of FIGS. 3A-3B. The body member 202 is primarily cylindrical and is extended into the fluid flow in a high shear wet granulation (HSWG) process over a period of time with an acquisition rate of 500 Hz. As computed by the system 10, based at least in part on the deformation measurements from the strain gauges 204, 205 over the period of time, it is discernable that the granulator blades exhibit a sin fit 501 frequency (one embodiment of a parameter of the fluid flow) and that the fluid flow has a plurality of force peaks 502. The plurality of force peaks 502 (another embodiment of a parameter of the fluid flow) provide information about the force, time and frequency of impacts resulting from particles, particle agglomerates and/or consolidated granules in the fluid flow. The system 10 leverages/processes this information to compute the magnitudes of these peaks, which are indicative of the mass and the density of the particulate fluid flow. One having ordinary skill in the art readily understands the algorithms necessary for these computations.

Figure 7:
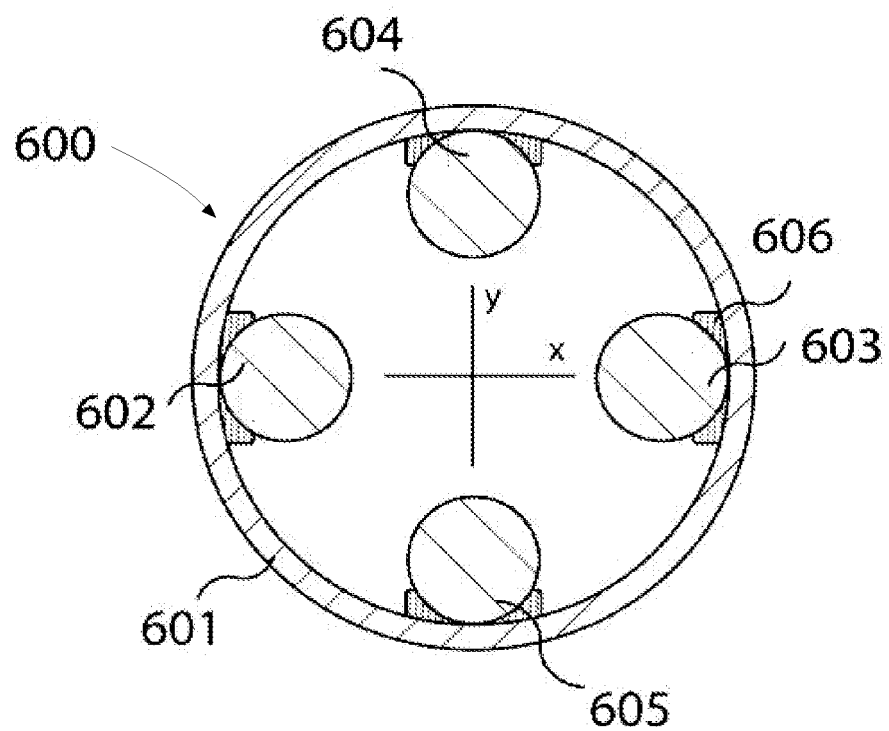
FIG. 7 is a top cross-sectional view of the body member along line 7'-7' of FIGS. 3A-3B.

FIG. 7 is a top cross-sectional view of the body member along line 7'-7' of FIGS. 3A-3B. In FIG. 7, the sensor 600 comprises a body member 601 that is substantially cylindrical along its length. The sensor 600 also comprises two strain gauge pairs, the strain gauges 602, 603 and the strain gauges 604, 605, engaged to the inner surface of the body member 601. The strain gauges 602, 603 and the strain gauges 604, 605 take deformation measurements at specific related internal surface segments such that the plane formed by the strain gauges 602, 603 (indicated with a line x) is perpendicular to the plane formed by strain gauges 604, 605 (indicated with a line y). It is envisioned that multiple other strain gauge pairs/groupings exist along the length of the body member 601 and that they can define various angles relative to the other strain gauge pairs/groupings.

As described herein, the two optical FGB strain gauges 204, 205 of FIGS. 3A-3B are positioned in such a way that the direction of the fluid flow 209 is parallel to the axial traversing plane on which the strain gauge pair lies. One having ordinary skill in the art understands that if the fluid flow 209 changes direction and if the sensor 200 only has the one pair/grouping of strain gauges depicted, the sensor 200 will only respond to the projection of the force relative to this plane. If that is the case, and if the magnitude and angular direction of the fluid flow is not otherwise known and/or sensed, the sensor 200 cannot provide the necessary deformation measurements to compute a desired fluid flow parameter.

This shortcoming is eliminated if the sensor 200 incorporates at least two pairs of strain gauges working in perpendicular directions. FIG. 7 depicts such an embodiment in the sensor 600. Therefore, at an arbitrary direction of the flow fluid (not depicted), the strain gauges 602, 603 take deformation measurements pertinent to the x vector component of the desired fluid flow parameter, and the strain gauges 604, 605 take deformation measurements pertinent to the y vector component of the desired fluid flow parameter. One having ordinary skill in the art readily understands the algorithms necessary for grouping and processing the deformation measurements and for computing a composite fluid flow parameter based on the derived vector components.

Figure 8:
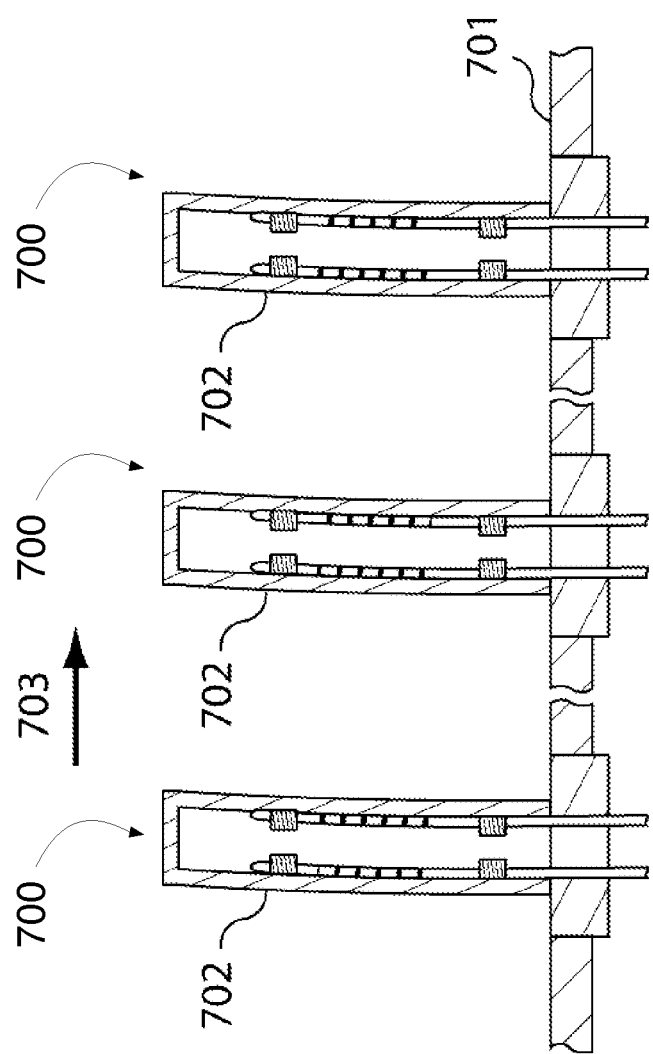
FIG. 8 is side cross-sectional view of one embodiment of a plurality of deformed cylindrical fluid flow sensors.

FIG. 8 is side cross-sectional view of an embodiment of a plurality of deformed cylindrical fluid flow sensors 700 similar to the fluid flow sensor 200 of FIGS. 3A-3B. The plurality of fluid flow sensors 700 are assembled in a series along the construction wall 701 of a vessel; however, the plurality of fluid flow sensors 700 are not limited to what is depicted in FIG. 8. One having ordinary skill in the art understands that the individual fluid flow sensors 700 are configured to be positioned along numerous paths of the wall 701. Moreover, the individual fluid flow sensors 700 are configured to be separated by large distances and to extend different lengths into the fluid flow 703. Moreover, the individual fluid flow sensors 700 each contribute sensory information to a hub component 99 and/or a computation server 118 for processing, as described herein. Moreover, the individual fluid flow sensors 700 are part of the same sensor package 125 or part of discrete sensory packages 125.

Figure 9:
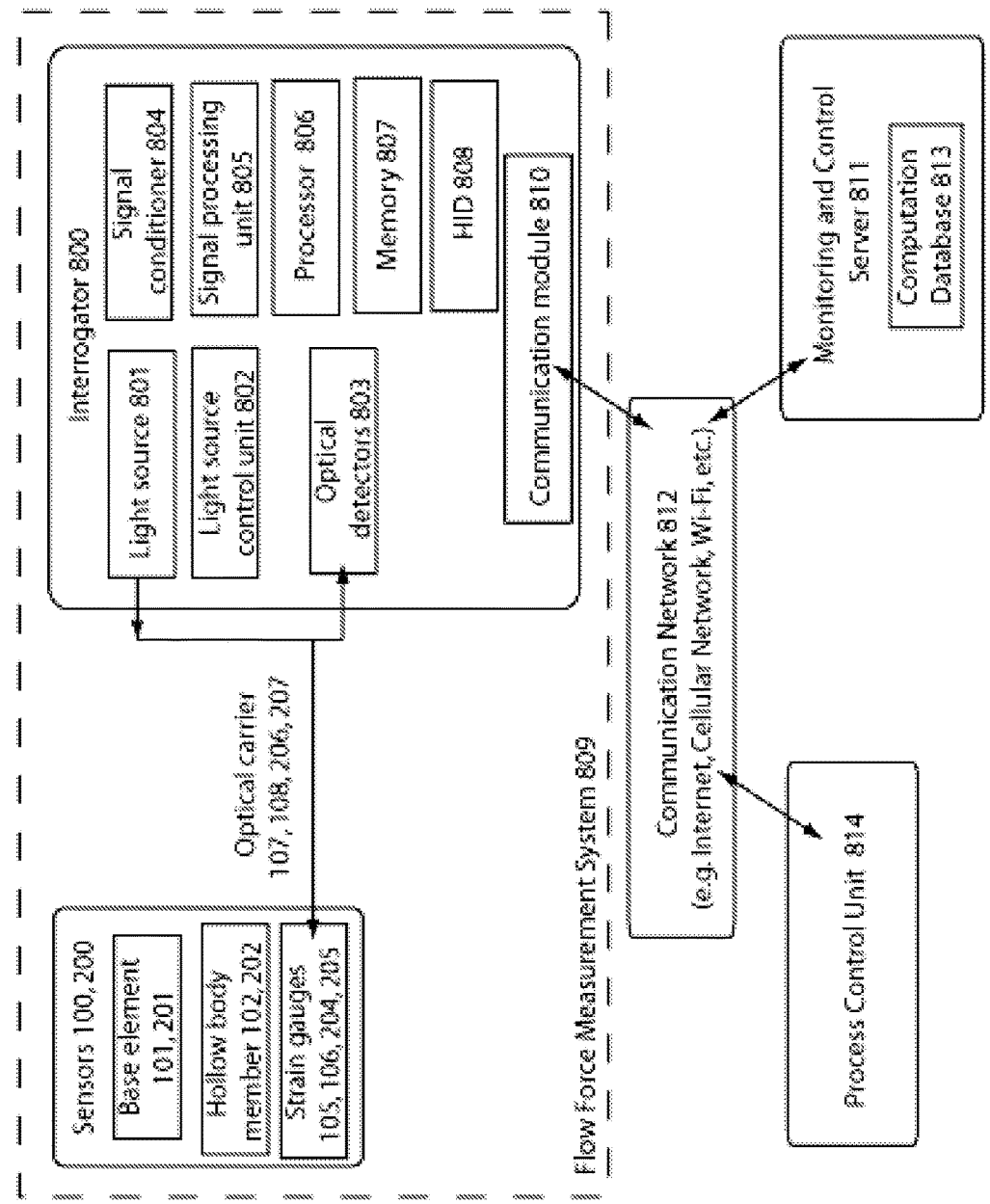
FIG. 9 is a high level functional block diagram of a fluid flow force measurement system for monitoring and control of an industrial process.

FIG. 9 illustrates a high level functional block diagram of a fluid flow force measurement system 809 for monitoring and control of an industrial process. One or multiple sensor(s) 100, 200 are extended into a fluid flow within a vessel. An interrogator 800 is communicatively coupled to the sensors 100, 200 via optical fibers 107, 108, 206, 207. The FBG strain gauges 105, 106, 204, 205 are interrogated with light from a light source of variable optical spectrum 801. The light source of variable optical spectrum 801 comprises a tunable laser and is controlled, at least in part, by a light source control unit 802.

The light reflected off of the specific internal surface segments of the strain gauges 105, 106, 204, 205 are communicated back to the interrogator 800 via the optical fibers 107, 108, 206, 207, as is readily understood in the art. More specifically, the light reflected contains information about the deformation of the internal surface segments and is indicative of the fluid flow parameters acting on the flexible hollow body member 102, 202. One or multiple optical detectors 803 of the interrogator 800 receive the light reflected off of the specific internal surface segments. Signal/data outputs from the optical detectors 803 are conditioned by a signal conditioner 804 and digitized by a signal processing unit 805.

The interrogator 800 is controlled by a computational module that comprises a processor 806, a memory 807, and a human interface device 806. The computational module, being preloaded with appropriate software, begins to, at least in part, process the deformation measurements, e.g., groups them, labels them, correlates them. Furthermore, the interrogator 800 additionally comprises a communication model 810 through which the interrogator 800 delivers the raw deformation measurements and/or the processed data/signals to a remote monitoring and control server 811. This involves a communication network 812.

Using a computation database 813 associated with the monitoring and control server 811, the monitoring and control server 811 analyzes data received from the interrogator 800 and, according to predetermined algorithm or user interferences, sends a control command/signal to the process control unit 814. The process control unit 814 then leverages that command/signal to introduce changes into the industrial process. For example, the process control unit 814 transmits control commands that change the rotation speed of a high-shear wet granulator involved in the industrial process. Moreover, the process control unit 814 transmits control commands that add a specified quantity of a chemical in the fluid flow. Based on certain feedback and control systems, the server 811 then changes the measurement regime/technique by modifying the software within the interrogator 800.

Figure 10:
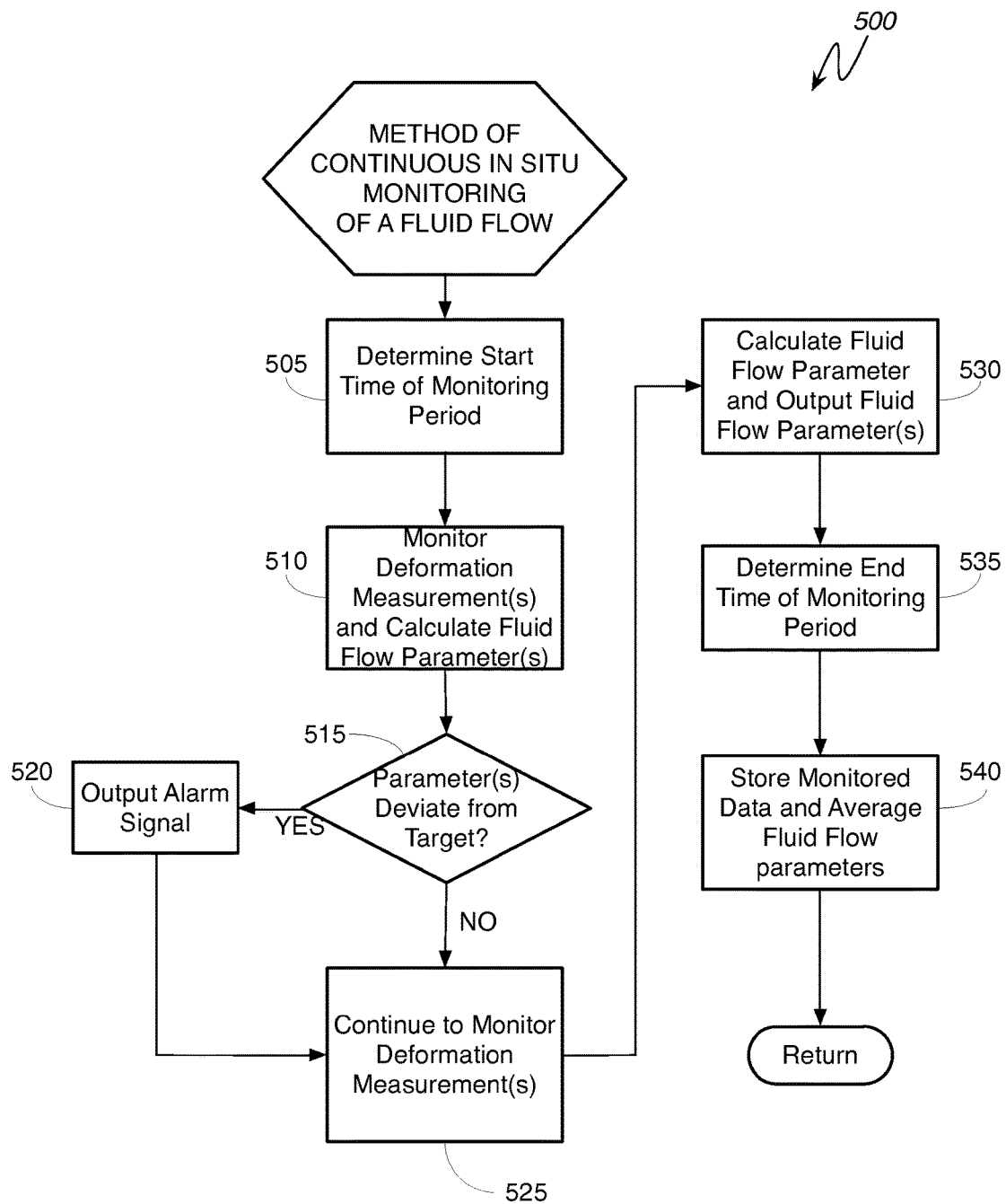
FIG. 10 is a logical flowchart illustrating a method of continuous in situ monitoring of a fluid flow within a vessel.

FIG. 10 is a logical flowchart illustrating a method of continuous in situ monitoring of a fluid flow within a vessel. Beginning at block 505, a computation module determines the start time of a monitoring period. At block 510, separate deformation measurement(s) from the individual strain gauge(s) of a fluid flow sensor in a sensor package are monitored by a monitoring module. At block 515, a monitor module and/or a computation module process the separate deformation measurement(s) from the individual strain gauge(s) to determine if a fluid flow parameter(s) deviates for a target. As is understood by one having ordinary skill in the art, this may comprise running regressive and/or statistical analysis of all past deformation measurement(s) and all present deformation measurement(s). Moreover, this may involve buffering and adjustments when necessary. Moreover, the targets may be a specific value, a range or a statistic deviation from a certain computed trend, as is understood by one having ordinary skill in the art.

Two deviations in the method occur if the computed fluid flow parameter(s) do(es) deviate from a target. If the computed fluid flow parameter(s) do(es) deviate from a target, then the method continues on to block 520 wherein an output alarm signal is communicated by the monitor module and/or the computation module. One having ordinary skill in the art understands that that output alarm signal may take the form of a visual alert to a user through the user interfaces described herein. One having ordinary skill in the art also understands that that output alarm signal may be in the background of the system and function as a silent signal that influences/affects the system's operation(s). Once the alarm signal is outputted, the method continues on to block 525.

If the computed fluid flow parameter(s) do(es) not deviate from a target, then, at block 525, separate deformation measurement(s) from the individual strain gauge(s) of the fluid flow sensor in the sensor package are continued to be monitored by the monitoring module. At block 530, the monitor module and/or the computation module process the separate deformation measurement(s) from the individual strain gauge(s) to compute a fluid flow parameter(s) and to output the fluid flow parameter(s) to the components of the system.

Next, at block 535, the computation module determines the end time of the monitoring period. Next, at block 540, the computation module stores the separate deformation measurement(s) from the individual strain gauge(s) and the computed fluid flow parameter(s). The computation module also stores any statistical analysis of the discrete fluid flow parameter(s) over the course of the monitoring period.

Figure 11:
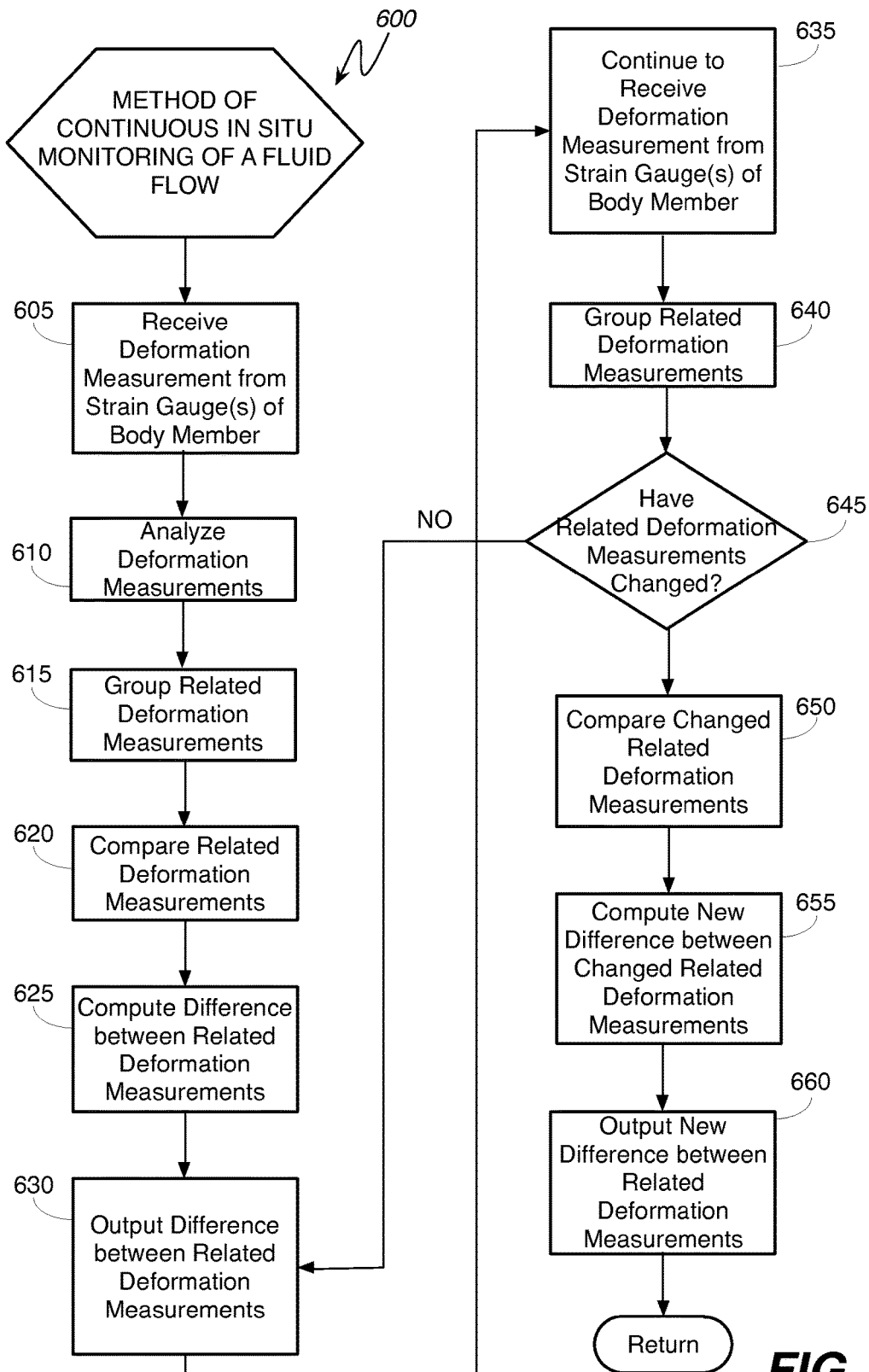
FIG. 11 is a logical flowchart illustrating a method of continuous in situ monitoring of a fluid flow within a vessel.

FIG. 11 is a logical flowchart illustrating another method of continuous in situ monitoring of a fluid flow within a vessel. Beginning at block 605, separate deformation measurement(s) from the individual strain gauge(s) of a body member of a fluid flow sensor are received by a monitoring module. At block 610, a computation module analyzes the separate deformation measurement(s) from the individual strain gauge(s).

At block 615, a computation module groups the related measurement(s) from the individual strain gauge(s). One having ordinary skill in the art understands that this may involve information about the relative location of the strain gauges and which internal surface segments they are reading. This may also involve the monitoring module transmitting information about the relationship between the strain gauges, i.e., whether they are part of a particular pre-established pair/grouping, whether they are in direct alignment with a sensed fluid flow direction, or whether they are at a particular angle relative to the fluid flow. This also may involve the monitoring module transmitting other related sensory data from other non-strain gauge sensors.

Next, at block 620, a computation module compares the related measurement(s) from the individual strain gauge(s) within the established grouping(s). One having ordinary skill in the art understands that this may involve processing historical information about past related measurements from the individual strain gauges to determine if the present measurement(s) is/are likely to be inaccurate or imprecise as compared to the others in the established grouping. This may involve comparing the measurement(s) within the group to determine if the present measurement(s) is/are likely to be inaccurate or imprecise. This may also involve statistical or regressive analysis, as is understood by one having ordinary skill in the art.

Next, at block 625, a computation module computes difference(s) between the related measurement(s) within the established grouping(s). One having ordinary skill in the art understands that this may be as simple a subtracting the related measurements within the established groupings. It may also involve more complicated methods of eliminating possible outliers and/or misgrouped measurements. It may also involve statistical analysis that results in an aggregate difference between the measurement(s) with in the established grouping(s).

Next, at block 630, the difference(s) between the related measurement(s) within the established grouping(s) is output to other system components. One having ordinary skill in the art understands this information can be useful for the computation of a fluid flow parameter(s), for computation of the differential signal between related strain gauges and for the computation of the average signal between related strain gauges.

Next, at block 635, further measurement(s) from the individual strain gauge(s) of a body member of a fluid flow sensor are received by the monitoring module. At block 640, the computation module then again groups the related measurement(s) from the individual strain gauge(s). At block 645, two deviations in the method occur if the groupings of related measurement(s) from the individual strain gauge(s) change from how they were grouped at block 615. If the groupings of related measurement(s) from the individual strain gauge(s) would not change from how they were grouped at block 615, then the method reverts to block 630.

If the groupings of related measurement(s) from the individual strain gauge(s) would change from how they were grouped at block 615, then, at block 650, the computation module compares the related measurement(s) from the individual strain gauge(s) within the newly established grouping(s). One having ordinary skill in the art understands that this may involve processing historical information about past comparisons between the related measurements from the individual strain gauges to determine if the present grouping(s) is/are likely to be inaccurately or imprecisely formed.

Next, at block 655, a computation module computes difference(s) between the related measurement(s) within the newly established grouping(s). Next, at block 660, the difference(s) between the related measurement(s) within the newly established grouping(s) is output to other system components.

Figure 12:
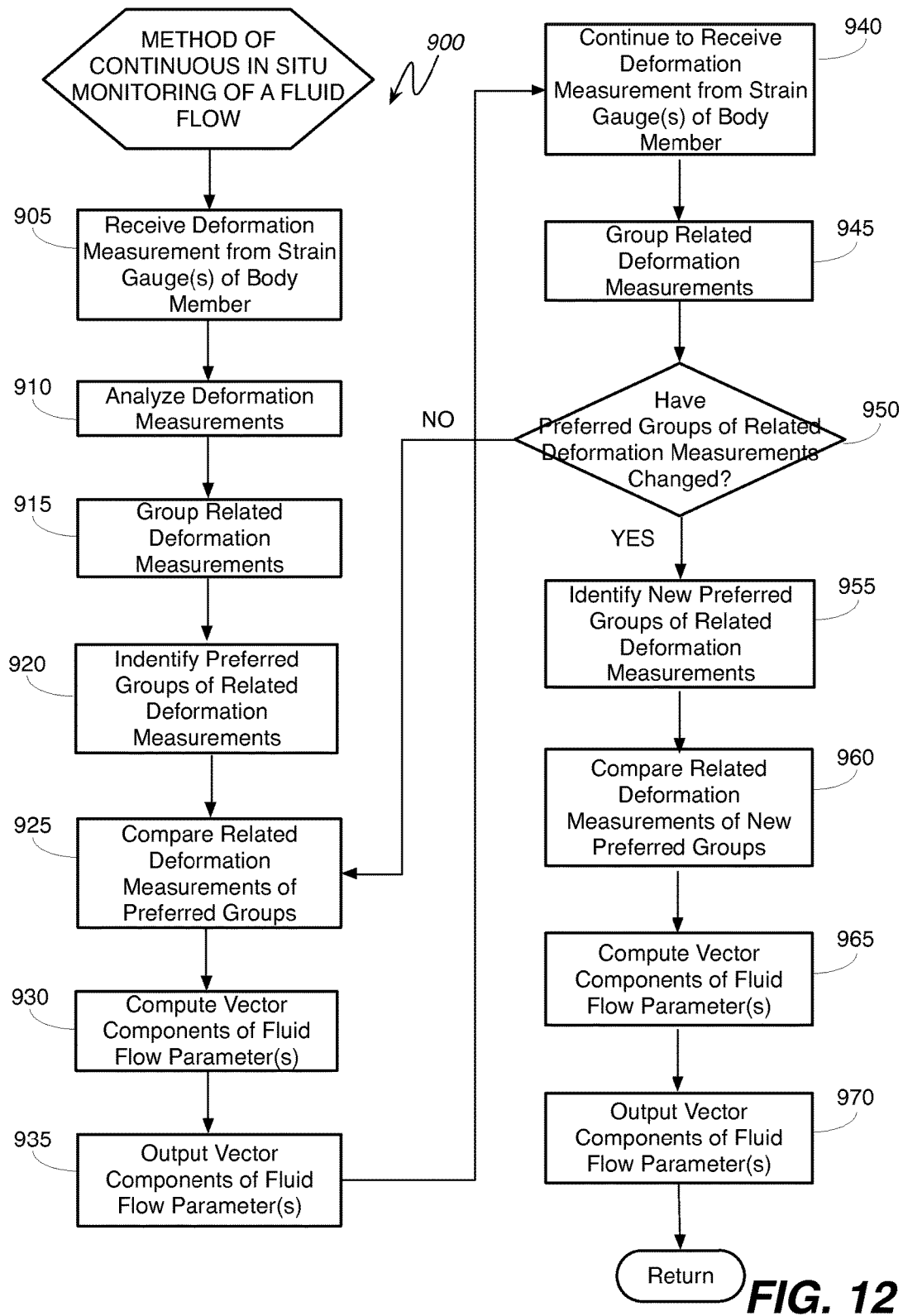
FIG. 12 is a logical flowchart illustrating a method of continuous in situ monitoring of a fluid flow within a vessel.

FIG. 12 is a logical flowchart illustrating another method of continuous in situ monitoring of a fluid flow within a vessel. The method 900 is essentially identical to the method 600 described above; however, a computation module additionally identifies preferred groupings of the established grouping(s) of block 920. One having ordinary skill in the art understands that the established groupings may be identified as preferred groupings depending on the specific shape and configuration of the body member of the sensor. It may also depend on the magnitude, direction and angle of the fluid flow as it interacts with the sensor, and how the potential preferred groupings relate to the fluid flow, i.e., whether all the strain gauges producing the measurements within the grouping are substantially parallel or substantially perpendicular to the fluid flow. For example, in FIG. 7, the grouping containing the deformation measurements from the strain gauges 602, 603 and the grouping containing the deformation measurements from the strain gauges 604, 605 may both be identified as preferred groupings because they represent groups of strain gauges that are parallel and perpendicular to the fluid flow 209, respectively.

Next, at block 925, the computation module compares the related measurement(s) from the individual strain gauge(s) within the identified preferred groupings. Next, at block 930, a computation module computes vector components of a fluid flow parameter based, at least in part, on the deformation measurement within the identified preferred groupings. One having ordinary skill in the art understands that this may involve a computation module computing the difference(s) between the related measurement(s) within the identified preferred groupings, as described in block 625 of method 600.

Next, at block 935, the computed vector components of a fluid flow parameter are output to other system components. One having ordinary skill in the art understands this information can be useful for the computation of a fluid flow parameter(s), for computation of the differential signal between related strain gauges and for the computation of the average signal between related strain gauges.

Next, at block 940, further measurement(s) from the individual strain gauge(s) of a body member of a fluid flow sensor are received by the monitoring module. At block 945, the computation module then again groups the related measurement(s) from the individual strain gauge(s). At block 950, two deviations in the method occur if the identified preferred groupings would change from those identified at block 920. If the identified preferred groupings would not change from those identified at block 920, then the method reverts to block 925.

If the identified preferred groupings would change from those identified at block 920, then, at block 955, the computation module newly identifies preferred groupings of the established grouping(s) from block 945. One having ordinary skill in the art understands that the established groupings may be newly identified as preferred groupings depending on the magnitude, direction or angle of the fluid flow as it interacts with the sensor.

Next, at block 960, the computation module compares the related measurement(s) from the individual strain gauge(s) within the newly identified preferred groupings. Next, at block 965, the computation module computes vector components of a fluid flow parameter based, at least in part, on the deformation measurement within the newly identified preferred groupings. Next, at block 970, the computed vector components of a fluid flow parameter are output to other system components.

Figure 13:
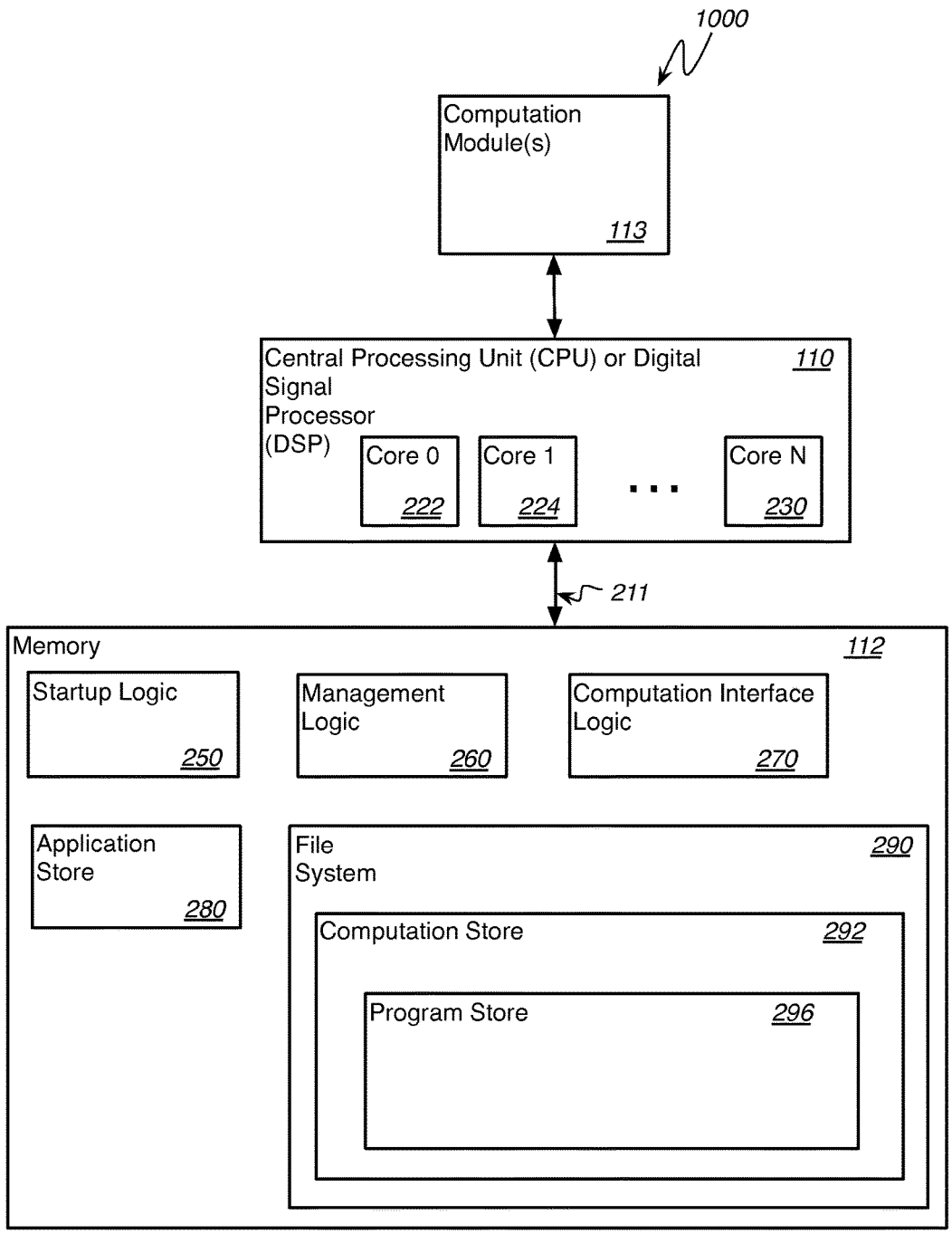
FIG. 13 is a schematic diagram illustrating an exemplary software architecture 1000 for devices, systems, and method of continuous in situ monitoring of a fluid flow within a vessel.

FIG. 13 is a schematic diagram illustrating an exemplary software architecture 1000 for devices, systems and method of continuous in situ monitoring of a fluid flow within a vessel. As illustrated in FIG. 13, the CPU or digital signal processor 110 is coupled to the memory 112 via main bus 211. The memory 112 may reside within a hub component 99, a sensor package 125 or a combination thereof. Similarly, it will be understood that the computation module 113 and the CPU 110 may reside within a hub component 99, a sensor package 125 or a combination thereof.

The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the computation module(s) 113 that may comprise software and/or hardware. If embodied as software, the module(s) 113 comprise instructions that are executed by the CPU 110 that issues commands to other application programs being executed by the CPU 110 and other processors.

The first core 222, the second core 224 through to the $N^{th}$ core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh, and crossbar topologies.

Bus 211 may include multiple communication paths via one or more wired, wireless or optical connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the components 99, 125 is implemented in software, as is shown in FIG. 13, it should be noted that one or more of startup logic 250, management logic 260, computation interface logic 270, applications in application store 280 and portions of the file system 290 may be stored on any computer-readable medium for use by, or in connection with, any computer-related system or method. In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or flash memory) (electronic), an optical fiber (optical), flash, and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the computation interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for identifying accurate sensor readings and/or generating a computation of fluid flow parameters. The startup logic 250 may identify, load and execute a select computation program. An exemplary select program may be found in the program store 296 of the embedded file system 290. The exemplary select program, when executed by one or more of the core processors in the CPU 110 may operate in accordance with one or more signals provided by the computation module 113 to identify accurate sensor readings and/or computer a fluid flow parameter.

The management logic 260 includes one or more executable instructions for terminating a system program on one or more of the respective processor cores, as well as selectively identifying, loading, and executing a more suitable replacement program. The management logic 260 is arranged to perform these functions at run time or while the component 99 is powered and in use by an operator of the device. A replacement program, which may be customized by a user in some system embodiments, may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the weight of parameters used to generate a customized computation algorithm.

The interface logic 270 enables a manufacturer to controllably configure and adjust an end user's experience under defined operating conditions on the component 99. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the component 99, 125 to search, locate, modify or replace the startup logic 250, the management logic 260, applications in the application store 280 and information in the embedded file system 290. The operator may use the resulting interface to make changes that will be implemented upon the next startup of the component 99, 125. Alternatively, the operator may use the resulting interface to make changes that are implemented during run time.

The embedded file system 290 includes a hierarchically arranged computation store 292. In this regard, the file system 290 may include a reserved section of its total file system capacity for the storage of information for the configuration and management of the various computation equations and/or system algorithms used by the components 99, 125.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features. Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above. Rather the scope of the invention is defined by the appended claims.

What is claimed is:

1. A method of continuous in situ monitoring of a rheologically complex fluid flow within a vessel, the method comprising:
   a) extending a sensor into a rheologically complex fluid flow within a vessel, the sensor comprising a body member with an elastically deformable curved external surface, a first strain gauge, a second strain gauge, a third strain gauge, and a fourth strain gauge, each positioned within the internal cavity, the body member defining an internal cavity such that the body member comprises a first, a second, a third, and a fourth external surface segment and a first, a second, a third, and a fourth internal surface segment, the internal cavity isolated from the fluid flow, wherein the first, the second, the third, and the fourth internal surface segment each, respectively, translates a deformation of the first, the second, the third, and the fourth external surface segment, respectively, wherein each of the first, the second, the third, and the fourth strain gauge, respectively, is positioned in the cavity and configured to detect the deformation of the first, the second, the third, and the fourth internal surface segment, respectively, and wherein the first strain gauge is coplanar with the second strain gauge and the third strain gauge is coplanar with the fourth strain gauge, and wherein the plane of the first and second strain gauge and the plane of the third and fourth strain gauge intersect each other and define an angle relative to each other;
   b) detecting, by the first strain gauge, a deformation of the first internal surface segment;
   c) detecting, by the second strain gauge, a deformation of the second internal surface segment;
   d) detecting, by the third strain gauge, a deformation of the third internal surface segment;
   e) detecting, by the fourth strain gauge, a deformation of the fourth internal surface segment;
   f) transmitting a deformation measurement of each of the first, the second, the third, and the fourth internal surface segment; and
   g) analyzing the deformation measurement of each of the first, the second, the third, and the fourth internal surface segment;
   wherein computing a fluid flow parameter is based, at least in part, on the deformation measurements of the first, the second, the third, and the fourth internal surface segment; and
   wherein computing the fluid flow parameter comprises:
   i) comparing the deformation measurements of the first and the second internal surface segments; and
   ii) comparing the deformation measurements of the third and the fourth internal surface segments;
   iii) calculating a difference between the deformation measurements of the first and the second internal surface segments;
   iv) calculating a difference between the deformation measurements of the third and the fourth internal surface segments;
   v) computing the fluid flow parameter, based at least in part, on the difference between the deformation measurements of the first and the second internal surface segments and the difference between the deformation measurements of the third and the fourth internal surface segments;
   vi) computing the differential signal, from the first and the second strain gauges, based, at least in part, on the difference between the deformation measurements of the first and the second internal surface segments;
   vii) computing the average signal, from the first and the second strain gauges, based, at least in part, on the difference between the deformation measurements of the first and the second internal surface segment; and
   viii) computing the deformation of the first surface segment that is due to the drag of the fluid flow relative to the thermal expansion of the first internal surface segment.

2. A method of continuous in situ monitoring of a rheologically complex fluid flow within a vessel, the method comprising:
   a) extending a sensor into a rheologically complex fluid flow within a vessel, the sensor comprising a body member with an elastically deformable curved external surface and a first strain gauge, a second strain gauge, a third strain gauge, and a fourth strain gauge, each positioned within the internal cavity, the sensor additionally comprising a reference temperature sensor configured to sense the temperature of the fluid flow, the body member defining an internal cavity such that the body member comprises a first, a second, a third, and a fourth external surface segment and a first, a second, a third, and a fourth internal surface segment, the internal cavity isolated from the fluid flow, wherein the first, the second, the third, and the fourth internal surface segment each, respectively, translates a deformation of the first, the second, the third, and the fourth external surface segment, respectively, wherein each of the first, the second, the third, and the fourth strain gauge, respectively, is positioned in the cavity and configured to detect the deformation of the first, the second, the third, and the fourth internal surface segment, respectively, and wherein the first strain gauge is coplanar with the second strain gauge and the third strain gauge is coplanar with the fourth strain gauge, and wherein the plane of the first and second strain gauge and the plane of the third and fourth strain gauge intersect each other and define an angle;
   b) detecting, by the first strain gauge, a deformation of the first internal surface segment;
   c) detecting, by the second strain gauge, a deformation of the second internal surface segment;
   d) detecting, by the third strain gauge, a deformation of the third internal surface segment;
   e) detecting, by the fourth strain gauge, a deformation of the fourth internal surface segment;
   f) communicating a deformation measurement of the first, the second, the third, and the fourth internal surface segment; and
   g) analyzing the deformation measurement of the first, the second, the third, and the fourth internal surface segment;
   wherein computing the fluid flow parameter is based, at least in part, on the deformation measurements of the first, the second, the third and the fourth internal surface segment; and
   wherein computing the fluid flow parameter comprises:
   i) comparing the deformation measurements of the first and the second internal surface segments; and
   ii) comparing the deformation measurements of the third and the fourth internal surface segments;

iii) calculating a difference between the deformation measurements of the first and the second internal surface segments;
iv) calculating a difference between the deformation measurements of the third and the fourth internal surface segments;
v) computing the fluid flow parameter, based at least in part, on the difference between the deformation measurements of the first and the second internal surface segments and the difference between the deformation measurements of the third and the fourth internal surface segments;
vi) computing the differential signal, from the first and the second strain gauges, based, at least in part, on the difference between the deformation measurements of the first and the second internal surface segments;
vii) computing the average signal, from the first and the second strain gauges, based, at least in part, on the difference between the deformation measurements of the first and the second internal surface segments; and
viii) computing the deformation of the first surface segment that is due to the drag of the fluid flow relative to the thermal expansion of the first internal surface segment;
ix) measuring, by the reference temperature sensor, the temperature of the fluid flow;
x) transmitting, by the reference temperature sensor, the temperature measurement of the fluid flow; and
xi) computing the thermal expansion of the first internal surface segment that is due to the temperature of the fluid flow relative to the drag of the fluid flow.

\* \* \* \* \*